(12) United States Patent
Wei et al.

(10) Patent No.: US 8,706,898 B2
(45) Date of Patent: *Apr. 22, 2014

(54) NAVIGATING A VIDEO, A TRANSCRIPT OF A DIALOG, AND A HISTOGRAM

(71) Applicant: Hulu LLC, Los Angeles, CA (US)

(72) Inventors: Eugene Chuan-Huai Wei, Los Angeles, CA (US); Varun Narang, Pittsford, NY (US); Zhibing Wang, Beijing (CN); Yuming Liang, Beijing (CN); Xin Jin, Beijing (CN); Ting-hao Yang, Shanghai (CN); Eric Feng, Menlo Park, CA (US); Andrew Cheng-min Lin, San Francisco, CA (US)

(73) Assignee: Hulu, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/666,441

(22) Filed: Nov. 1, 2012

(65) Prior Publication Data

US 2013/0091299 A1 Apr. 11, 2013

Related U.S. Application Data

(63) Continuation of application No. 12/635,605, filed on Dec. 10, 2009, now Pat. No. 8,332,530.

(51) Int. Cl.
*G06F 15/16* (2006.01)

(52) U.S. Cl.
USPC .......................................... 709/231; 707/769

(58) Field of Classification Search
USPC .......................................... 709/231; 707/769
See application file for complete search history.

(56) References Cited

U.S. PATENT DOCUMENTS

| 6,112,172 | A | 8/2000 | True et al. |
| 6,452,615 | B1 | 9/2002 | Chiu et al. |
| 7,747,655 | B2 * | 6/2010 | Hull et al. ..................... 707/802 |
| 8,332,530 | B2 | 12/2012 | Wei et al. |
| 2002/0163548 | A1 | 11/2002 | Chiu et al. |
| 2002/0188621 | A1 | 12/2002 | Flank et al. |
| 2004/0080528 | A1 | 4/2004 | Rand et al. |
| 2005/0182792 | A1 | 8/2005 | Israel et al. |

(Continued)

FOREIGN PATENT DOCUMENTS

GB 2443959 A 5/2008

OTHER PUBLICATIONS

U.S. Appl. No. 12/635,609, filed Dec. 10, 2009, entitled "Method and Apparatus for Navigating a Media Program Via a Histogram of Popular Segments".

(Continued)

*Primary Examiner* — John Follansbee
*Assistant Examiner* — Glenford Madamba
(74) *Attorney, Agent, or Firm* — Fountainhead Law Group P.C.

(57) ABSTRACT

A method and apparatus for navigating a media program via a searchable transcript of the dialog of the media program is disclosed. In one embodiment, a textural transcript of the dialog is generated, wherein the textural transcript comprising a plurality of portions wherein each portion is associated with a segment of the media program, a command is accepted to display the transcript and in response to that command, user interface data is transmitted to the client computer for presentation in a user interface, wherein the user interface comprising a concurrently presented media program player and the textural transcript.

35 Claims, 16 Drawing Sheets

(56) References Cited

U.S. PATENT DOCUMENTS

| | | |
|---|---|---|
| 2006/0031199 A1 | 2/2006 | Newbold et al. |
| 2006/0256210 A1 | 11/2006 | Ryall et al. |
| 2006/0263037 A1 | 11/2006 | Gilley |
| 2006/0263038 A1 | 11/2006 | Gilley |
| 2006/0265657 A1 | 11/2006 | Gilley |
| 2007/0055986 A1 | 3/2007 | Gilley et al. |
| 2007/0136251 A1 | 6/2007 | Colledge et al. |
| 2007/0245243 A1 | 10/2007 | Lanza et al. |
| 2007/0276790 A1 | 11/2007 | Walsh et al. |
| 2008/0066107 A1 | 3/2008 | Moonka et al. |
| 2008/0187279 A1 | 8/2008 | Gilley et al. |
| 2008/0240560 A1 | 10/2008 | Hibino et al. |
| 2009/0160859 A1* | 6/2009 | Horowitz et al. ............ 345/440 |
| 2009/0216742 A1* | 8/2009 | Coffman et al. .................. 707/5 |

OTHER PUBLICATIONS

U.S. Appl. No. 12/635,605, filed Dec. 10, 2009, entitled "User Interface Including Concurrent Display Video Program, Histogram, and Transcript".

* cited by examiner

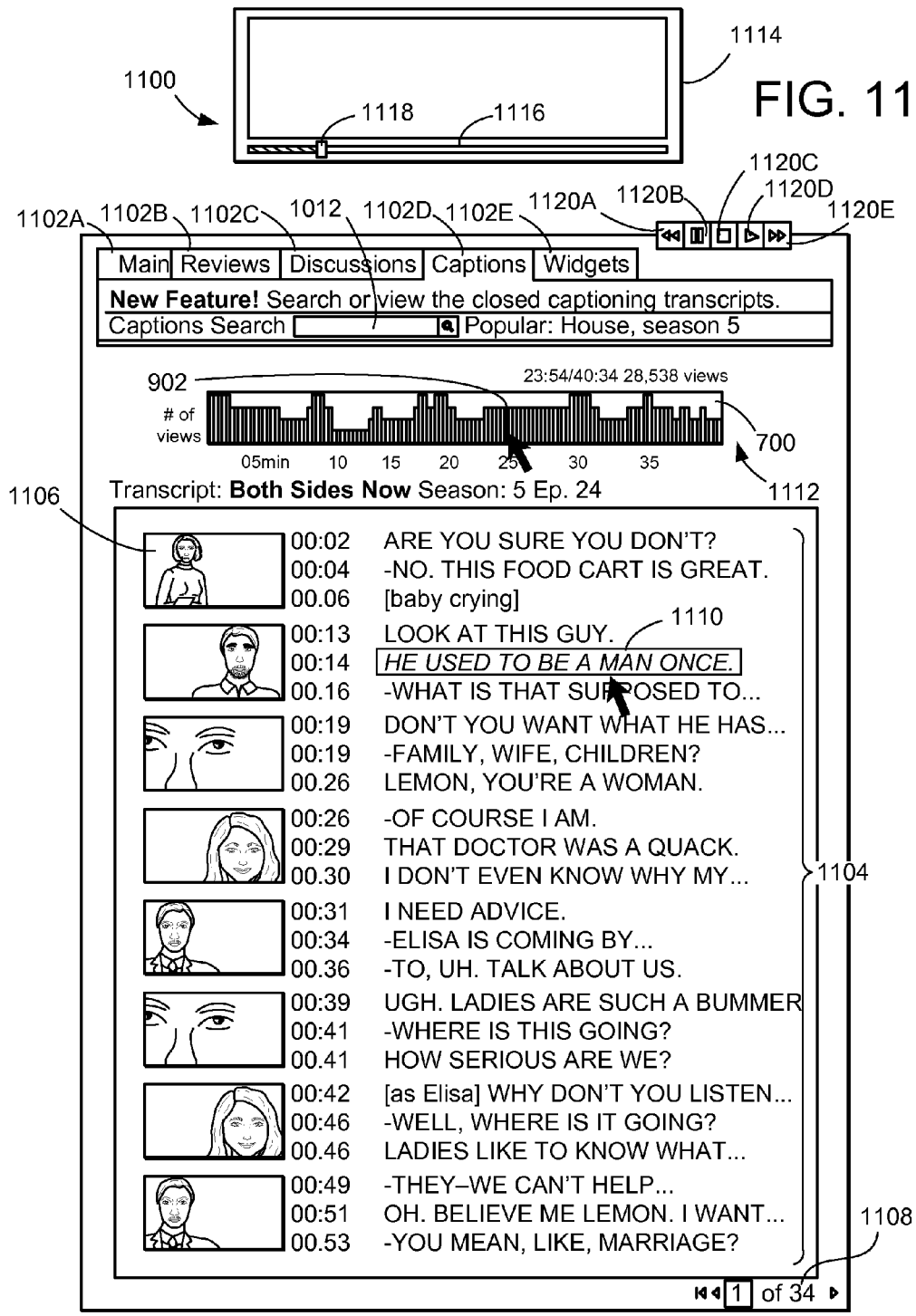

NAVIGATING A VIDEO, A TRANSCRIPT OF A DIALOG, AND A HISTOGRAM

CROSS-REFERENCE TO RELATED APPLICATIONS

This application is a continuation of U.S. application Ser. No. 12/635,605, entitled "USER INTERFACE INCLUDING CONCURRENT DISPLAY OF VIDEO PROGRAM, HISTOGRAM, AND TRANSCRIPT" filed on Dec. 10, 2009, which is incorporated by reference herein.

This application is also related to the following co-pending and commonly assigned patent application(s), all of which applications are incorporated by reference herein:

U.S. application Ser. No. 12/635,609, entitled "METHOD AND APPARATUS FOR NAVIGATING A MEDIA PROGRAM VIA A HISTOGRAM OF POPULAR SEGMENTS" filed on Dec. 10, 2009, by Eugene Chuan-Huai Wei, Varun Narang, Zhibing Wang, Yuming Liang, Xin Jin, Ting-hao Yang, Eric Feng and Andrew Cheng-min Lin.

BACKGROUND OF THE INVENTION

1. Field of the Invention

The present invention relates to systems and methods for streaming media programs, and in particular to a system and method for visually depicting popular portions of a media program and navigating same.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and satellite). These methods of dissemination and playback have become competitive with traditional means. Dissemination of media programs via the Internet may occur either by simple downloading, progressive downloading or streaming.

Simple downloading downloads the bytes of the media file in any convenient order, while progressive download downloads bytes at the beginning of a file and continues downloading the file sequentially and consecutively until the last byte. At any particular time during progressive downloading, portions of the file is not be immediately available for playback . . . the entire file must be downloaded first before a media player can start playback.

For progressive downloading, a media file having the media program is downloaded via the Internet using dial-up, DSL, ADSL, cable, T1, or other high-speed connection. Such downloading is typically performed by a web server via the Internet. In progressive downloading, media players are able to start playback once enough of the beginning of the file has downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence if the network bandwidth is lower than the data rate required by the video file, the user would have to wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media sever communicates with the client computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

Typically, progressively downloaded media is transmitted to the client computer at a rate that is faster than playback. The media program player buffers this data, and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

A similar control is often provided with streaming media. However, with streaming media, the control can be moved to any point in the program. If the control is moved to a temporal point in the program that has been buffered, playback can commence from that point, much like is the case with progressively downloaded data. However, if the control is moved to a temporal point in the program that has not been buffered, the media program player transmits a control message having a request to the streaming server to play the media program beginning at the temporal location represented by the control. The streaming server receives the request and transmits the media program to the client computer, beginning at the requested point.

One of the difficulties with the viewing of streamed and progressively downloaded media programs is that although the user may potentially move the control on the progress bar to move forward or backward in the media program, the user is given little or no information about the media content at the current location of the control. Hence, the user is compelled to "hunt" for scenes that they are interested in. This is not only inconvenient for the user, in the case of a streamed media program, the user's requests for different points in the media program can place an unnecessary burden on the streaming server. What is needed is a method and apparatus for quickly navigating a media program.

SUMMARY OF THE INVENTION

A method and apparatus for navigating a media program via a searchable transcript of the dialog of the media program is disclosed. In one embodiment, a textural transcript of the dialog is generated, wherein the textural transcript comprising a plurality of portions wherein each portion is associated with a segment of the media program, a command is accepted to display the transcript and in response to that command, user interface data is transmitted to the client computer for presentation in a user interface, wherein the user interface comprising a concurrently presented media program player and the textural transcript.

BRIEF DESCRIPTION OF THE DRAWINGS

Referring now to the drawings in which like reference numbers represent corresponding parts throughout:

FIG. 11 is a diagram presenting an exemplary user interface by which the user may elect to view the transcript of a media program;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
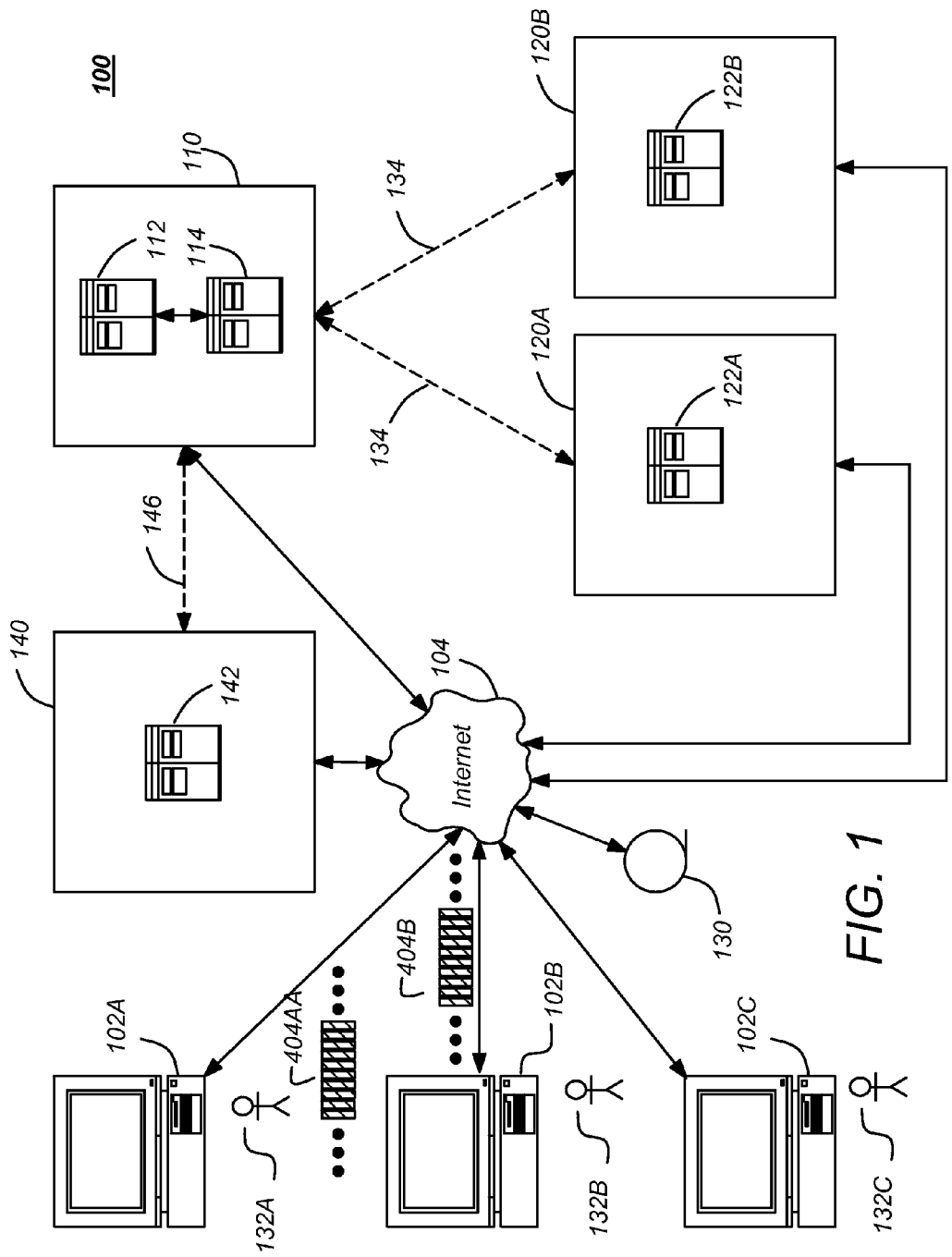
FIG. 1 is a diagram illustrating an exemplary media program system.

FIG. 1 is a diagram illustrating an exemplary media program system 100. In the illustrated embodiment, the system 100 may comprise one or more media program sources 120A, 120B (alternatively referred to as media program source(s) 120) communicatively coupled to a communication network 104 such as the Internet. Each of the media program sources 120 includes one or more source media servers 122A, 122B (alternatively referred to hereinafter as source media server(s) 122). In one embodiment, the source media servers store databases of information, including the media programs.

The media program system 100 further comprises a media program provider 110, communicatively coupled to the communication network 104, and having one or more provider media servers 112 and one or more provider web servers 114. In one embodiment, the media program provider 110 is a video-on-demand and/or streaming media program provider.

The media program system 100 may stream media programs to the client computers 102A-102C (hereinafter alternatively referred to as client computer(s) 102) directly from the media program provider 110, or the media program provider 110 may operate as a portal, providing an interface to the media programs available from the media program sources 120, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by a database maintained by the media program provider 110. If supplementary metadata is required, it can be obtained from a metadata source 130 independent from the media program provider 110 and the media program source 120.

In the second case, the media programs are streamed to the client computers 102 directly from the servers 122 of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides users 132A-132C (hereinafter alternatively referred to as user(s) 132) a list of available media programs and an interface to search to find such programs and to view them.

Media programs and metadata may be obtained via a communication network 104 such as the Internet, or through auxiliary (and/or dedicated) communication links 134). Such information may be obtained by web crawling (for example, using a program or automated script that browses the World Wide Web in a methodical, automated manner).

Using a client computer(s) 102, remote user(s) 132 can communicate with the media program provider 110 using the communication network 104, to obtain media programs (including video-on-demand and/or streaming video services) and to search provider media program databases to find media programs of interest.

The media program system 100 may also comprise one or more advertisement provider 140, which supply advertisements that are replayed in connection with the media programs provided by the media program provider 110 or media program sources 120. In the illustrated embodiment, the advertisement provider 140 includes an advertisement provider server 142 communicatively coupled to an associated memory, which may store a database of advertisements.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the client computer(s) 102 at the appropriate time.

In one embodiment, the advertisements are integrated with the streamed or downloaded video from the media program provider 110. In another embodiment, the advertisements are not integrated with the media program, but are instead transmitted to the client computer(s) 102 separately from the media program, and replayed at the appropriate time using indices that indicate when each advertisement should be presented. For example, advertisements can be indexed and streamed or downloaded to the client computer(s) 102 (from the media program provider 110 or the advertisement provider 140) and such advertisements can be played back to the user(s) 132 at times indicated by corresponding indices in the media program.

Figure 2:
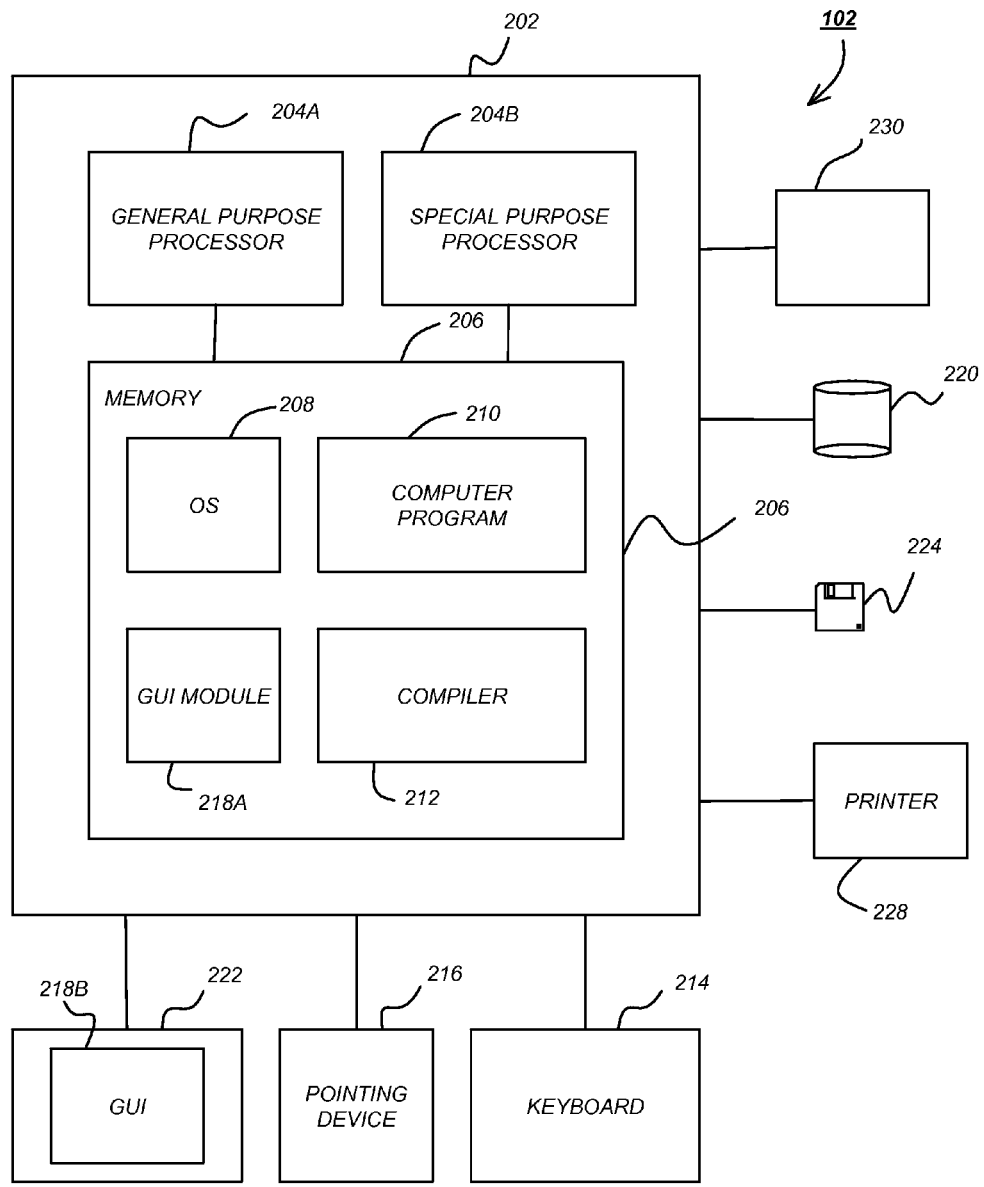
FIG. 2 illustrates an exemplary computer system that could be used to implement elements the present invention.

FIG. 2 illustrates an exemplary computer system 202 that could be used to implement elements the present invention. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general-purpose processor 204A performing instructions defined by the computer program 210 under control of an operating system 208. The computer program 210 and/or the operating system 208 may be stored in the memory 206 and may interface with the user(s) 132 and/or other devices to accept input and commands and, based on such input and commands and the instructions defined by the computer program 210 and operating system 208 to provide output and results.

Output/results may be presented on the display 222 or provided to another device for presentation or further processing or action. Typically, the display 222 comprises a plurality of picture elements (pixels) that change state to collectively present an image to the user(s) 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, the some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "client computer" is referred to herein, it is understood that a client computer(s) 102 may include portable devices such as cellphones, portable MP3 players, video game consoles, notebook computers, pocket computers, personal data assistants (PDAs) or any other device with suitable processing, communication, and input/output capability.

Figure 3:
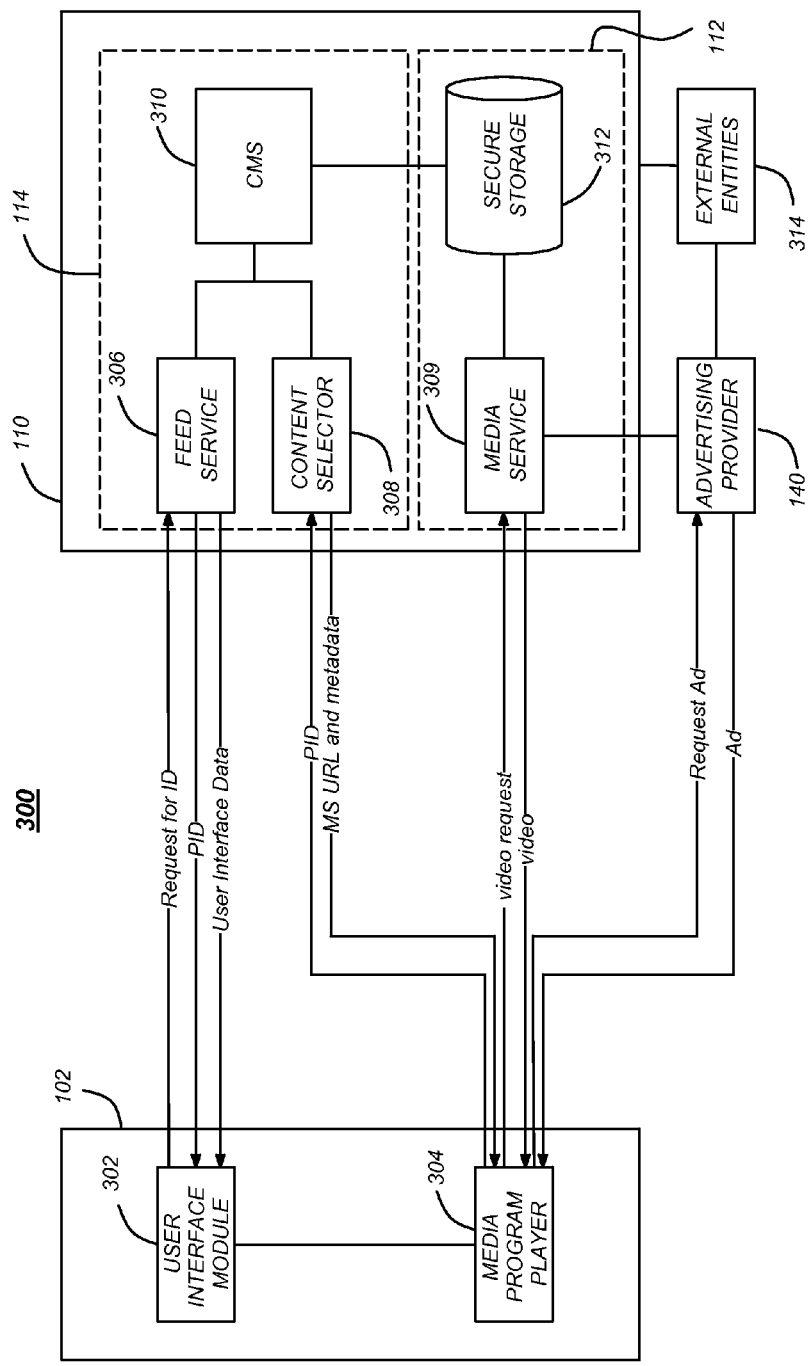
FIG. 3 is a diagram illustrating a content delivery subsystem and top-level operations that can be used to deliver media programs and advertisements for presentation to a user.

FIG. 3 is a diagram illustrating a content delivery subsystem (CDS) 300 and top-level operations that can be used to deliver media programs and advertisements for presentation to a user(s) 132.

In this embodiment, the content delivery subsystem 300 includes the client computer(s) 102, the media program provider 110, and may include an advertisement provider 140. Although the advertisement provider 140 is illustrated as a separate architectural entity than the media program provider 110, the advertisement provider 140 may be integrated within the media program provider 110. The CDS 300 provides a means to provide media programs and advertisements across a plurality of distribution networks, which may include www.hulu.com, www.imdb.com, www.aol.com or www.msn.com. Metadata related to media program and advertisement content is stored in the content delivery system 300, as is data describing where the media programs and advertisements may be found within the CDS 300.

The client computer(s) 102 includes an interface module 302 and a media program player 304. The interface module 302 includes instructions performed by the client computer(s) 102 that are used to present information to the user(s) 132 and to accept user input, including commands to select, play, and navigate the media program. The presented information may include a program guide, the histogram and transcript described below.

In the illustrated embodiment, the web server 114 comprises a feed service 306 and a content selector 308 communicatively coupled to a content management service (CMS) 310. The media server 112 comprises a media service 309 communicatively coupled to a memory 114 to securely store the media programs.

Using the client computer(s) 102 and the interface module 302, the user 132 enters a choice for a media program. The user interface module 302 transmits a request message to the feed service 306 for a program identifier (PID). The PID is used to identify content such as a specific media program running on a specific distribution network. For example, season 2 of "The Office" running on www.hulu.com will have a different PID than the same exact show running on www.msn.com.

The feed service 306 then returns the PID to the user interface module 302. The PID and associated commands (e.g. the play command) are provided to the media program player 304. The media program player 304 may be embedded in a webpage from a third party, or may be part of a webpage maintained by the media program provider 110, or may be implemented in a standalone application.

The media program player 304 transmits the PID to a content selector 308. The content selector 308 identifies the actual path (uniform resource locator or URL, for example) to the requested media program associated with the transmitted PID, as well as programming metadata that is used by the media program player 304 to help identify restrictions (for example, preventing access to adult-themed content if the user 132 is known to be under 18), advertising targeting rules as well as advertising breaks. The advertising breaks indicate where advertisements may be inserted, and can be specified in terms of the time since the beginning of the media program, the time remaining, or any other suitable measure. The URL and the metadata are then transmitted to the media program player 304, along with other information that is provided to allow the user 132 to select and navigate media programs.

The media program player 304 provides a video request to a media server 115 at the URL received from the content selector 308. The video request includes the PID and may include other information as well. The video request may be for streaming or progressively downloading the requested media program.

The media server 112 responds to the video request by providing the media program from a media service 309 to the client computer 102. In one embodiment, the media server 112 is a service provider that has a wide range of geographically distributed computers that store replicated copies of media programs and website content. The media service 114 can be implemented by a third party provider (e.g. only contractually associated with the media program provider 110), or can be part of the media program provider 110. Geographically diverse servers assures that when the user 132 requests playback of a media program, the media program is streamed from a geographically local server, to increase media program playback performance. Multiple servers also offer redundancy.

The media service 309 obtains the media program from secure storage 312 which may be disposed in the media program provider 110 facility, or which may be disposed at a third party facility. The content management service 310 interfaces with the feed service 306, the content selector 308, and secure storage 312 to manage which media programs are provided to the media service 114. External entities 314 can include third parties such entities that provide the advertisements that are to be displayed to the user(s) (which includes sponsors and/or their advertising agencies), third party providers of media programs, and entities from which the user(s) 132 may purchase goods or services.

The media program is transmitted to the media program player 304. As described above, the media program may be streamed or progressively downloaded to the media program player 304. In one embodiment, the media program player 304 plays the media program, and at the times identified in the advertising breaks defined above, requests advertisements from the advertising provider 140 using a path (e.g. URL) provided either by the content selector 308 or the media server 112. The advertising provider 140 streams the requested advertisement is streamed to the media program player 304 at the appropriate time, where it is displayed to the user(s) 132. In another embodiment, the media server 112 obtains the advertisements from the advertising provider 140 and inserts the advertisements in the media program before the media program is streamed or progressively downloaded to the media program player 304.

Media Program Streaming

As described above, media program streaming allows a user(s) 132 to select a media program (for example, by selecting a link on a referring website), thus requesting a media network to stream the media program to the viewer's computer as though it was coming from the referring website itself. Because the media files are typically hosted on a separate network and provided by a separate media server, the streaming has little or no impact on existing web servers.

Media program streaming breaks the media program into segments sized according to the bandwidth available between the client and the media server. When the client computer has received enough segments, the software can be playing one packet, decompressing another, and downloading the third. This enables the user(s) 132 to listen or view the real-time file almost immediately, and without downloading the entire media file. This applies to live data feeds as well as stored media programs.

Figure 4:
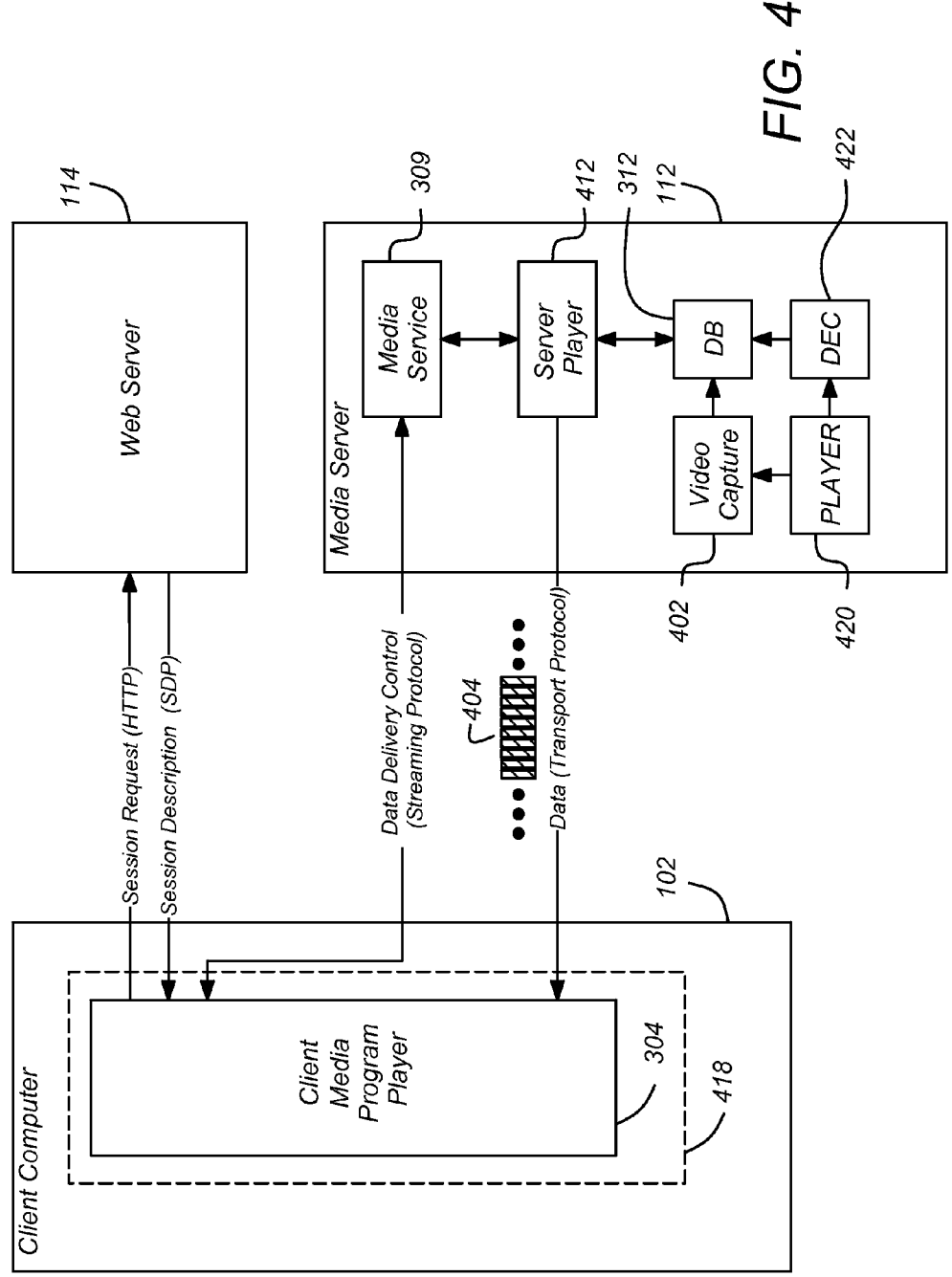
FIG. 4 is a diagram illustrating the streaming of a media program.

FIG. 4 is a diagram illustrating the streaming of a media program. A client media player 304 running in a client computer such as the client computer(s) 102 issues a session request to a web server 406 to initiate a streaming session. The web server 406 responds by transmitting a session description to the client media player 304. Using the session description, the client computer(s) 102 then sets up a session with the media server 112.

Data delivery control messages are then exchanged between the client computer media player 304 and a media service 309 of the media server 112 via a streaming protocol. The data delivery control messages control the request and delivery of data segments 404, each comprising a plurality of data packets that that together comprise the media program. Based on the data delivery control messages, the data segments 404 are retrieved from a media database 312 in which streaming media programs are stored, and transmitted from the server player 412 to the client media player 304 via a transport protocol.

The stored streamed media programs are created by the process of capturing the video from an analog source and storing it to a disk. This is usually accomplished with a media player 420 providing a signal to video capture device 402 such as a computer having a video capture card and the appropriate capture software. The video capture device may also support the delivery of "live" video in addition to the storage of media programs for later streaming.

After storage, the media program can be edited. An authoring tool may also be used to integrate the media program with other multimedia, if desired. The edited and integrated media program is then encoded to the appropriate streaming file format and stored in the database 312. Typically, this involves specifying the desired output resolution, frame rate, and data rate for the streaming video file. When multiple data rates need to be supported (e.g. when the bandwidth of the communications link between the media server 112 and the client media program player 304 is measured and used to select the achievable data rate), multiple files may be produced corresponding to each data rate. Alternatively, one encoded media program can be produced that has a dynamic bandwidth that can be adjusted to the bandwidth supported by the link between the client media program player 304 and the media server 112.

Using the data delivery control messages, the media server 112 manages the delivery of the media program to the client media program player 304 using the appropriate network transport protocols. Typically, the media server 112 comprises a hardware platform that has been configured for the delivery of real-time video plus media server software that runs under an operating system that regulates the delivery of media program streams.

The client media program player 304 receives and buffers the media program stream and plays it in an appropriate sized window on the client computer(s) 102, typically via a videocassette recorder-like user interface. Client media players 304 generally support such functions as play and stop, as well as trick play function such as fast forward, fast reverse, and seek. The client media player 304 can be stand-alone media player or may be a browser 418 plug-in or an Active-X control.

The protocols used to stream media programs may include:

Hypertext Transfer Protocol (HTTP): An application-level protocol for distributed, collaborative, hypermedia information systems. It is a generic, stateless, object-oriented protocol that can be used for many tasks, such as name servers and distributed object management systems, through extension of its request methods. As shown in FIG. 4, the session request will typically conform to HTTP.

Session Description Protocol (SDP): STP is a media description format used to describe multimedia sessions for the purposes of session announcement, session invitation, and other forms of multimedia session initiation. In the example shown in FIG. 4, the session description may conform to SDP.

Real Time Streaming Protocol (RTSP): RSTP is an application-level streaming protocol that is used to control the delivery of data with real-time properties such as the media program itself. RTSP provides controlled, on-demand delivery of audio and video. Typically, this is accomplished using the Transmission Control Protocol (TCP). TCP manages message acknowledgement, retransmission, and timeout, and requires handshaking to assure messages are delivered. If messages are lost during transmission, retransmission of the lost message is requested. Once a connection is set up, user data may be sent bidirectionally over the connection. TCP can be used to send commands from the client 404 (such as "start" and "pause") and sending commands from the media server 112 to the client media program player 304 for specific information (such as the title of media programs and clips). RSTP messages may include request messages and response messages. Request messages can be sent by a client computer 102 to the media server 112 server or vice versa, and include the method to be applied to the resource and the identifier of the resource. Response messages are transmitted in response to an RSTP request message. RSTP methods can include the following:

DESCRIBE: The DESCRIBE method retrieves the description of a media program identified by the request (typically identified by the URL associated with the media program). This function includes request and response pair that are used to initialize the link.

SETUP: The SETUP method specifies the transport mechanism to be used for the streamed media program. Transport parameters acceptable to the client media player 304 for data transmission are specified, and the response from the server includes the transport parameters selected by the media server 112.

OPTIONS: The OPTIONS method requests available methods.

ANNOUNCE: The ANNOUNCE method requests a description of media object

PLAY: The PLAY method starts or repositions playback of the media program. The PLAY method tells the media server 112 to start sending the media program data via the mechanism that was specified in the setup command. The PLAY request positions the normal play time to the beginning of the range specified and delivers stream data until the end of the range is reached REDIRECT: The REDIRECT method redirect client media player 304 to different media server 112.

PAUSE: The PAUSE method causes the stream delivery to be interrupted (halted) temporarily. If the request URL names a stream, only playback and recording of the named stream is halted. For example, for audio, this is equivalent to muting. If the request URL names a presentation or group of streams, delivery of all currently active streams within the presentation or group is halted. After resuming playback or recording, synchronization of the tracks is maintained. Media server 112 resources are maintained, though servers MAY close the session and free resources after being paused for the duration specified with by timeout parameter, which may be provided in the message sent with the SETUP method.

SET PARAMETER: This method permits device or encoding control.

TEARDOWN: The TEARDOWN method stops the stream delivery for the media program associated with a given uniform resource identifier (URI), freeing the resources associated with it. If the URI is the presentation URI for currently streamed media program, any RTSP session identifier associated with the session is no longer valid. Unless all transport parameters are defined by the session description, a SETUP request must be issued before the media program can be played again.

Real-time Transport Protocol (RTP): RTP is a user datagram protocol (UDP) packet format and set of conventions that provides end-to-end network transport functions suitable for applications transmitting real-time data, such as audio, video or simulation data, over multicast or unicast network services. UDP is simple, connectionless protocol in which information is transmitted in one direction from the source to the destination without verifying the readiness or state of the receiver.

Real-time Control Protocol (RTCP): RTCP is the control protocol that works in conjunction with RTP. RTCP control packets are periodically transmitted by each participant in an RTP session to all other participants. RTCP is used to control performance and for diagnostic purposes.

Media programs may be transmitted on-demand, live, or simulated. live. When transmitted on-demand, a clip of a media program is available to the user(s) 132 whenever the user(s) want it. The user(s) can fast-forward, rewind, or pause the clip, and media server 410 will send the portion of the media program that is requested. Typically, on-demand media programs are prerecorded or pre-assembled.

Live delivery allows the user(s) to tune in to the action that is currently being transmitted. Since the user(s) can not fast-forward or rewind through the clip, because the media program is being transmitted in real time. Delivery of content as a live event requires that the live media program be encoded for streaming video delivery. Live media programs or clips can be delivered via unicasting, splitting, or multicasting. Unicast media programs are simply transmitted to the client as any other media program. Splitting allows the media server to share its live media streams with other media servers. Clients connect to the other media servers rather than to the main media server where the streams originate. This allows the traffic load on the originating media server to be reduced, allowing it to distribute other media programs at the same time. Multicasting allows media programs to be delivered to subsets of the uses sharing a common communication channel.

Simulated live delivery is analogous to the delivery of pre-recorded events that are broadcast as if they were live events (e.g. the transmission of sporting events into different time zones).

The present invention presents the user with additional information and allows that additional information to be used to navigate the media program. That additional information includes (1) a histogram indicating the relative popularity of different portions of the media program and (2) a searchable transcript of the dialog of the media program. In one embodiment, both the histogram and the searchable transcript are presented to the user 132 concurrently, and are linked so that user input with regard to one is reflected in the other, but the histogram and the searchable transcript may be separately presented. These features allow the user 132 to find a known portion of the media program of interest quickly, and also allows the user to find portions that may be of interest.

Display of Histogram Showing Number of Views

Figure 5:
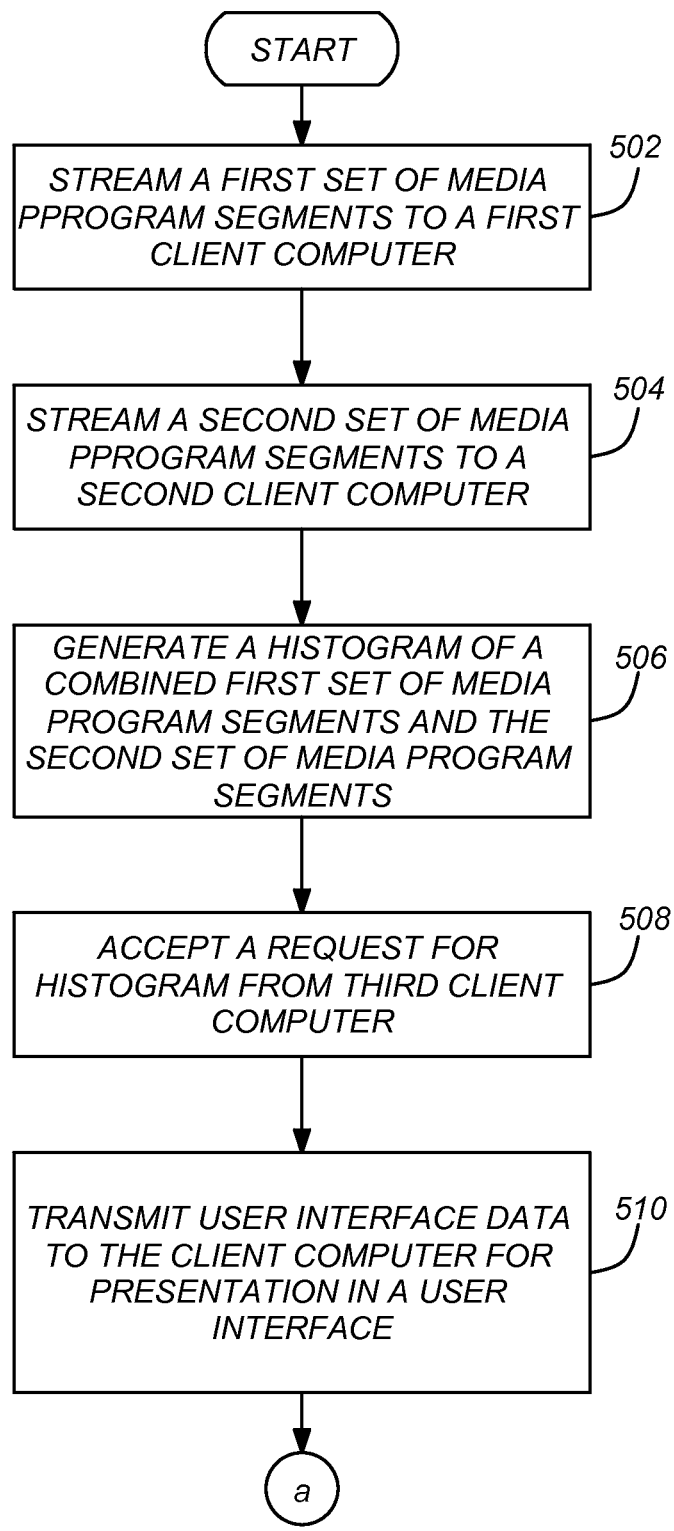
FIG. 5 is a diagram presenting exemplary method steps that can be used to present a histogram to the user.

FIG. 5 is a diagram presenting exemplary method steps that can be used to practice one embodiment of the present invention. In block 502, a first set of media program segments 140A are streamed to a first client computer 102A. This can be initiated in accordance with a session request issued by the client computer 102A, or a trick play function (e.g. fast forward, seek, reverse, or pause) initiated by the user associated with the client computer 102A. In block 504, a second set of media program segments 140B are streamed to a second client computer 102B. Generally, the first set of media program segments 140A are different than the second set of media program segments 140B. For example, the first set of media program segments 140A may represent the portion of the media program extending from time 0:20:00 to time 0:25:00, while the second set of media program segments 140B may represent the portion of the media program extending from time 0:10:00 to 0:12:00, or from time 0:17:00 to 0:23:00. However, first set of media program segments 140A and the second set of media program segments 140B may be the same media program segments.

Next, a histogram of the combined first set of media program segments and the second set of media programs is generated, as shown in block 506. In block 510, user interface data is transmitted to the client computer 102C for presentation in a user interface. The user interface data comprises the histogram having features such as bars that represent the media program segments. The histogram is preferably presented concurrently with the media program player 304 on the same display 222. As shown in block 508, the histogram 700 may be provided, for example, in response to a histogram request from the third client computer 102C, or may be provided any time the user 132 requests a streamed media program. Further, although the histogram request may come from a third client computer 102C, it may come from the first client computer 102A, the second client computer 102B, or any client computer 102.

Figure 6:
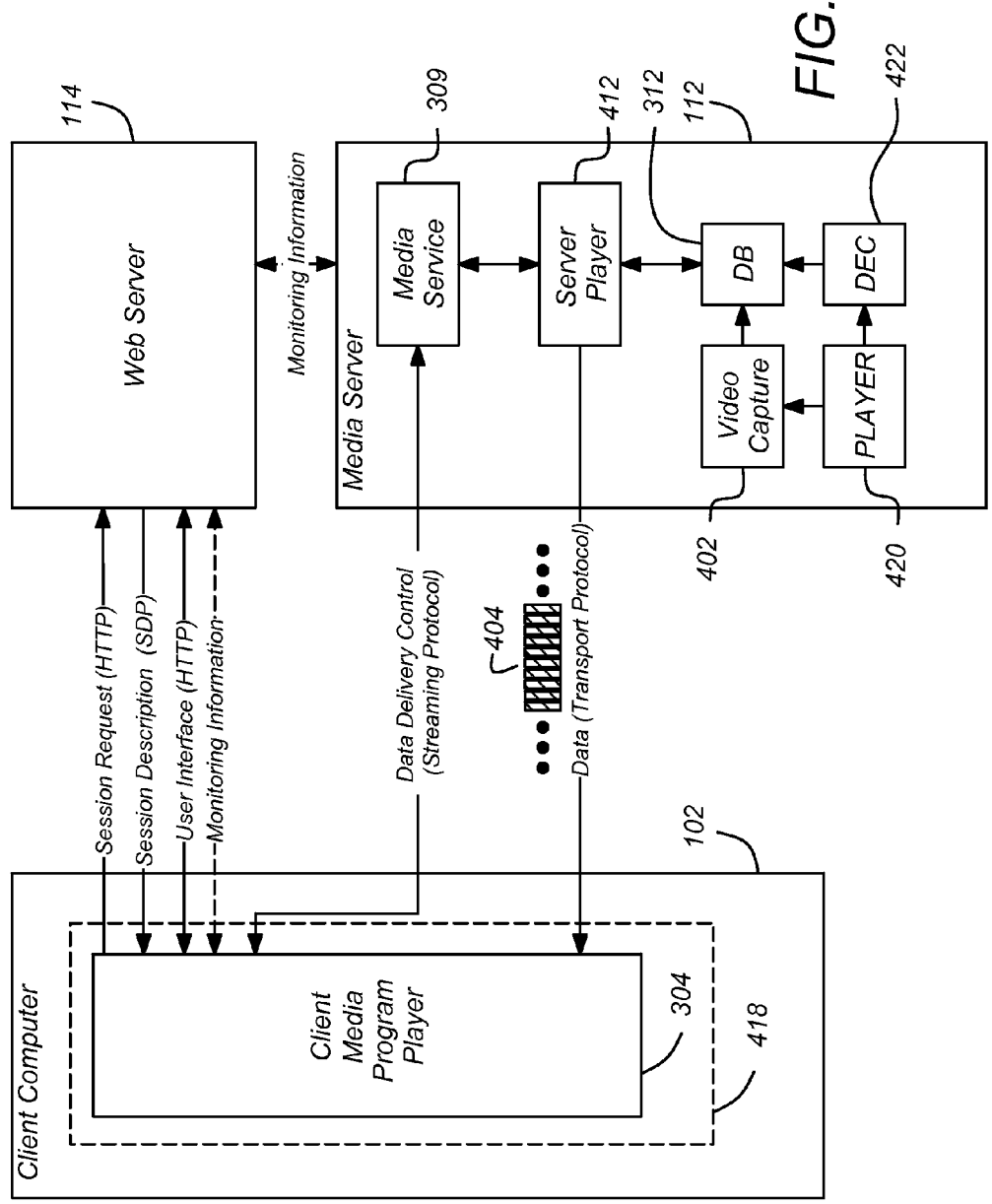
FIG. 6 is a diagram illustrating one embodiment of how the operations depicted in FIG. 5 can be implemented.

FIG. 6 is a diagram illustrating one embodiment of how the foregoing operations can be implemented. Essentially, this can be accomplished by (1) monitoring the data delivery control messages exchanged between the client computer 102 and the media server, and transmitting the monitored information to the web server 114, or by (2) monitoring the transmission/reception of the media program segments or packets by the media server 112/client computer 102 and transmitting this information to the web server 114.

The control messages may be monitored by the client computer 102 and transmitted to the web server 114, or may be monitored by the media server 112 and transmitted to the web server 114. Similarly, the transmission of the media program may be monitored by the media server 112 and transmitted to the web server 114, or the reception of the media program may be monitored by the client computer 102 and transmitted to the web server 114.

Monitoring Data Control Messages

In one embodiment, information indicating which media segments have been requested and/or have been transmitted to the client media player 304 is obtained by monitoring the data delivery control messages between the client media player 304 and the media server 410. This can be accomplished by monitoring data delivery control messages to determine directly which segments were requested and acknowledged, or by inferring which segments were requested and transmitted by play and trick play commands.

For example, if a PLAY command has been issued by the client media program player 304 to the media server 112, it can be assumed that all of the segments were transmitted and received by the client media program player 304 until a command is received that would halt delivery of the segments (e.g. a PAUSE, STOP, or TEARDOWN command, for example). Similarly, it can be assumed that following a PLAY command, all segments were transmitted and received by the media program player 304 until a trick play command is received (e.g. moving a control on a progress bar from on temporal location of the media program to another.

As another example, the client media program player 304 may generate a SEEK events such as SEEK_BACK and SEEK_FORWARD. A SEEK_BACK event commands the media program to begin replay of the media program from a location that is temporally behind the current playback point. In one embodiment, the current playback point is visualized as a cursor such as the slider control 1118 depicted in FIG. 11 that can be moved forward and backwards to navigate through different locations on the progress bar 1116, each of which represent a different temporal location in the media program. A SEEK_BACK command is issued from the client media program player 304 if the slider control 1118 is selected and moved to the left, and a SEEK_FORWARD command is issued from the client media program player 304 if the slider control 1118 is moved to the right. The SEEK_BACK and SEEK_FORWARD commands specify the original cursor position (before the SEEK_BACK command is issued), and the desired cursor position (after the SEEK_BACK command is completed). Using this information, the SEEK_BACK command can be used to contribute a first popularity score the affected portion of the media program (temporally between the original cursor position and the current cursor position) and the SEEK_FORWARD command can be used to contribute a second popularity score (lower than the first popularity score) for the affected portion of the media program. In one embodiment, the first popularity score can be a positive value and the second popularity score can be a negative value, and the positive and negative scores can be subtracted from a baseline score.

The monitoring of trick play functions rather than individual segments or blocks of segments also has other advantages. Since users 132 generally use trick play functions to navigate to portions of the media program that they are interested in, it is reasonable to assume that the portion that is navigated to was a portion of significant interest to the user 132. The same is not necessarily true for users who simply play the media program from start to finish. A user 132 who has started playback of a media program and entered no further commands until the media program has completed playback is likely less interested in any particular portion of the media program than a user that used a trick play function to view the same portion of the media program, and may not be watching the media program at all. However, a user 132 who is navigating through the media program through a series of trick play functions is very likely watching the media program, and very likely interested in the portion of the media program they are navigating to. Accordingly, in determining popular portions of the media program, heavier weight may be given to data regarding segments that are viewed after one or more trick play navigation commands. Further, segments played between a series of trick play commands that are closely distributed in time are an indication that the user is navigating the media program to find a desired scene, and such segments can be ignored and not counted in the playback statistics presented in the histogram 700, if desired.

The monitoring and transmission of data delivery control messages to the web server 114 may be implemented in the client computer 102 (via a hardware module, a routine in the client media program player 304, a browser 418 plug-in, or an application in the client computer), or may be implemented in the media server 112.

The data control messages may also be accompanied by information describing the media program being viewed and the client computer 102 or user 132, so that the data delivery control messages are distinguishable between client computers 102 and media programs.

Transmitting Playback Information to the Media Server

The monitoring of the data delivery control messages exchanged between the client computer 102 and the media server 112 uses information that is already exchanged for purposes of streaming the media program. However, information regarding which segments have been viewed can be obtained without resort to the data delivery control messages. For example, the client media program player 304 may simply transmit the appropriate information to the web server 114 via the user interface HTTP connection established during set up, or through a separate lightweight HTTP connection established for that purpose. The information transmitted can be analogous to the data delivery control messages passed between the client media program player 304 and the media server 112 (the SEEK_BACK and SEEK_FORWARD, for example), or my instead comprise other information.

In one embodiment, a beacon service is implemented to transmit the media program segment viewing information to the web server 114. The beacon service is an application that transmits beacon information to the web server 114, either through an existing communication link such as the user interface HTTP connection, or through a separate lightweight HTTP connection. Beacon information can be inserted into the media program before the media program is streamed to the client computer 102. For example, beacon information may be inserted into or between frames or packets every three minutes. When the client computer 102 plays the portion of the media program or encounters the packet, a beacon is transmitted from the client computer 102 to the web server. The reception of the beacon indicates that an associated portion of that media program has been played back. If the user were to issue a SEEK_BACK command, that beacon would be encountered again during playback and transmitted to the web server 114 again, thus indicating that the associated portion of the media program has been replayed again. In this embodiment, the transmitted beacons may be unique such that they can be distinguished from one another (each beacon having a different identifier than any other beacon). Additional information indicating the media program and the user may be transmitted, but is unnecessary so long as the transmitted beacon is globally unique. Alternatively, the beacon may be only unique to the media program (e.g. the first beacon may simply be the number "3" indicating that first three minutes of the media program has been replayed), and the information transmitted may include a media program identifier to distinguish it from beacons of other media programs.

Alternatively or in addition to the fixed beacons described above, beacon information can be generated by the beacon service based playback of the media program or user commands. This "seek beacon" information is then transmitted to the web server 114 and used to determine which segments of the media program have been replayed by the client computer 102. For example, if the user 132 issues a SEEK_BACK command, a beacon having information regarding the original cursor position and the cursor position after the SEEK_BACK command may be transmitted to the web server 114. As another example, if a media program is shared between users (e.g. user 132A sends a link to user 132B with the URL of the shared video), the second user's client media program player 304 sends just one SEEK_FORWARD event to the media server 112 requesting the media program at the start time. If no further information is received regarding the playback of that media program, it can be inferred that the second user played back the remainder of the media program. As before the information may include a media program identifier so that the media program associated with the command may be determined, or the identity of the media program may be inferred from.

Monitoring Media Program Segment Transmission or Reception

In another embodiment, the information may be obtained by monitoring which segments are actually transmitted by the media server 112 using a hardware, software, or firmware module in the media server 112, and transmitting this information to the web server 114 or headend. Alternatively, information may be obtained by monitoring which segments are received by the client computer 102 and transmitting this information to the web server 114 or headend. In this embodiment, a module implemented in the client media player 304, browser 418, or elsewhere in the client computer 102 may transmit a message to the web server 406 indicating which media program segments have been received, for example, using an Internet link and HTTP.

In any of the foregoing embodiments, the monitoring of the portions of the media program transmitted or received can be accomplished at a packet level, rather than a segment level. It is also possible to indicate which segments have been received merely by transmitting the beginning and end time for the portions of the media program that have been received.

Figure 7:
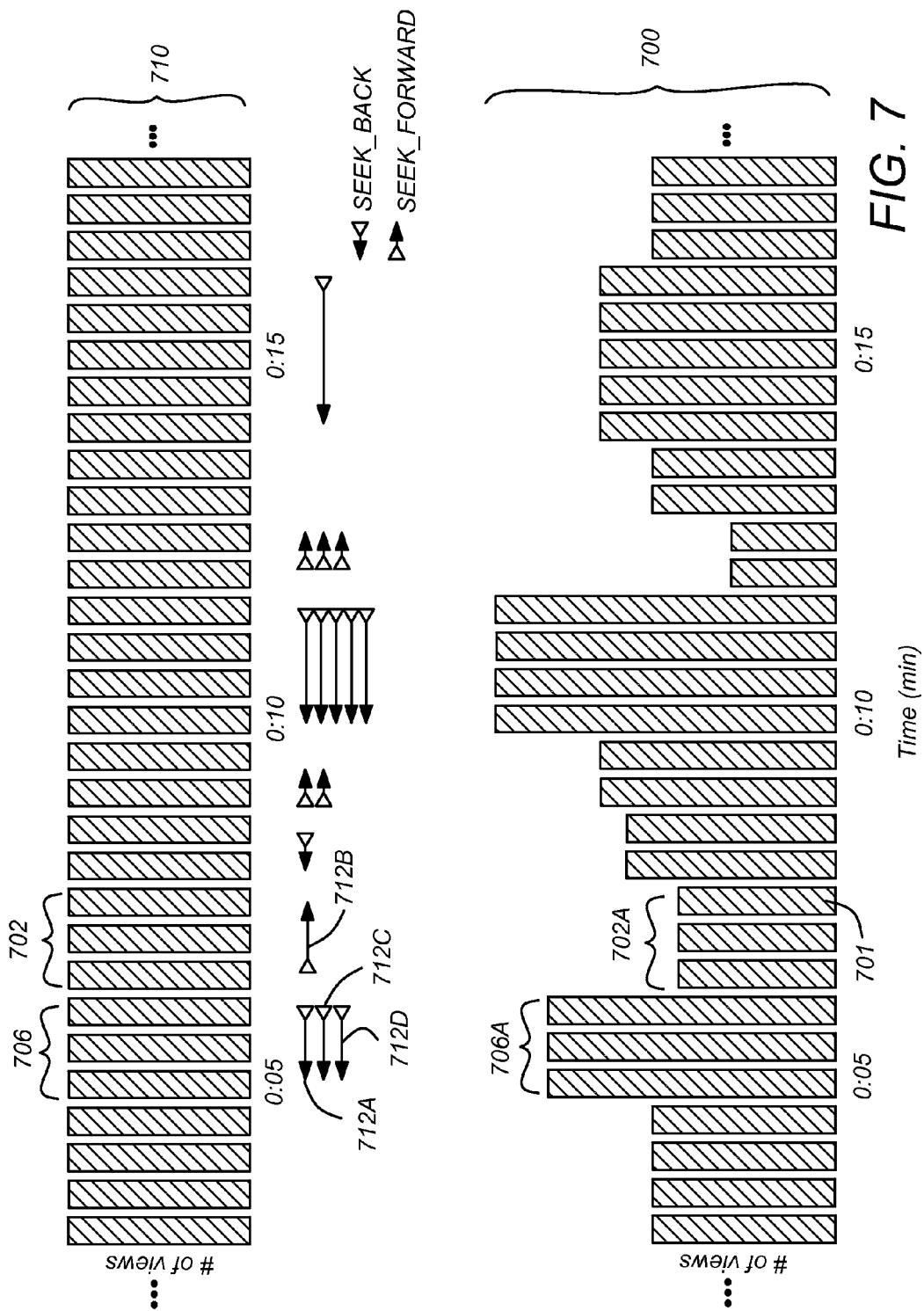
FIG. 7 is a diagram illustrating a typical embodiment of at least a portion of a displayed histogram.

FIG. 7 is a diagram illustrating a typical embodiment of at least a portion of a displayed histogram 700, and illustrating one method for generating the histogram. The histogram comprises a plurality of features such as bars 701, each bar 701 representing one or more segments of the media program. In the illustrated embodiment, each bar 701 represents thirty seconds of the media program. The length of each bar 701 is determined by the popularity "score" of the media program represented by the media segment represented by the bar 701. In one embodiment, the length of the bar 701 may indicate the number of "views" of the media segment or media segments represented by the bar 701. For example, bar 701 is shorter than bar 706, to indicate that the segment or segments represented by bar 701 were viewed fewer times than the segment or segments represented by bar 706. Of course, the temporal length of the segments can be selected to be longer or shorter as desired.

One technique in using trick play (e.g. SEEK) commands to determine the popularity of a particular video segment is also illustrated in FIG. 7. Item 710 is a baseline histogram 710 wherein all of the segments are deemed to be of equal popularity. SEEK_FORWARD and SEEK_BACK commands are illustrated using open-tailed arrows 712A and 712B. Arrow 712A illustrates a SEEK_BACK command from the temporal location indicated by the open tail to the temporal location indicated by the solid arrow tip, whereas arrow 712B indicates a SEEK_FORWARD command from the temporal location indicated by the open tail to the temporal location indicated by the solid arrow tip. Arrows 712C and 712D indicate SEEK_BACK commands that may have been received from a different client computer 102 than the SEEK_BACK command represented by arrow 712A.

The popularity of each segment 701 can be determined by adding a "view" if the segment was viewed with a SEEK_BACK command, and subtracting a "view" if the segment was bypassed by a SEEK_FORWARD command. For example, in the embodiment illustrated in FIG. 7, segments 706 were the replayed three additional times due to SEEK_BACK commands 712A, 712D, and 712C, and hence the corresponding features 706A representing the segments in the histogram are increased in length to indicate three additional views over the baseline. Similarly, segments 702 were skipped by SEEK_FORWARD command 712B, and the corresponding features 702A representing the segments in the histogram are decreased in length to indicate one less view than the baseline. Other embodiments are possible, for instance, segments that are skipped via the SEEK_FORWARD command may simply be give no viewing score (rather than subtracting a view).

In one embodiment, the data regarding how many times a segment is viewed is received in a module in the web server 406, which compiles the information together to determine the total number of times each segment has been viewed, computes the histogram 700 and transmits the histogram 700 to the client computer 102 for presentation, typically by a module resident in the browser 418 or client media program player 304. However, other embodiments are possible in which the foregoing operations are allocated between the client computer 102 and the web server 406 and media server 112 differently. For example, histogram statistics may be generated by the media server 112 and transmitted to the web server 406.

Navigation of the Media Program via Histogram

Figure 8A:
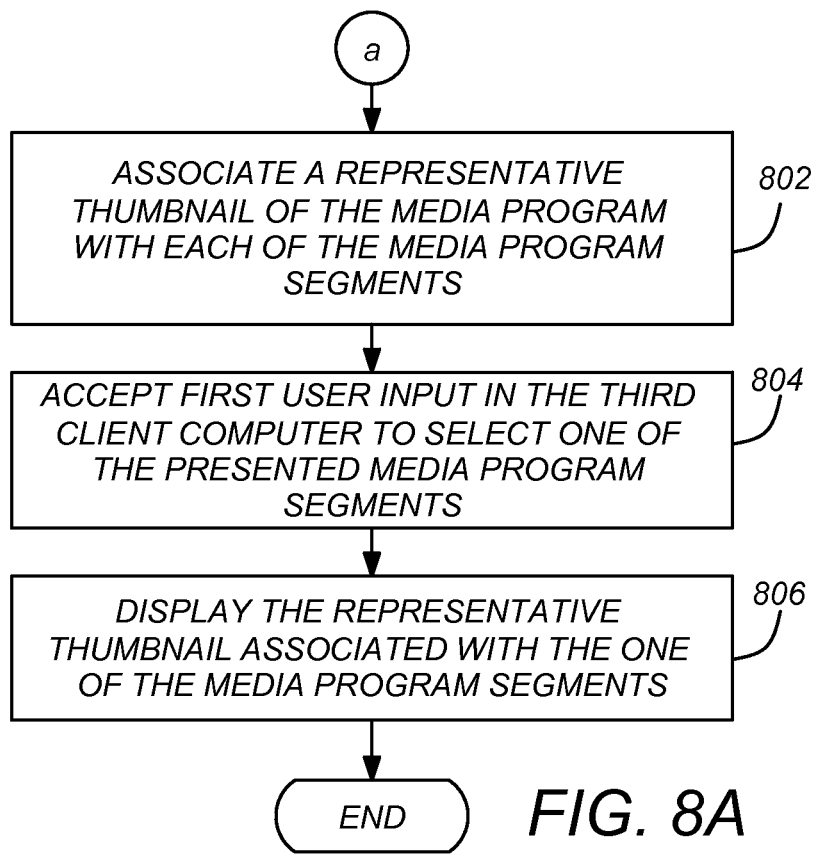
FIG. 8A is a diagram illustrating exemplary method steps in which the histogram can be used to assist in the navigation of the media program.

FIG. 8A is a diagram illustrating exemplary method steps in which the histogram can be used to assist in the navigation of the media program. In block 802, a representative thumbnail of the media program is associated with each of the media program segments. Typically, the web server 406 identifies a thumbnail that represents each of the segments of the media program.

In block 804, user input is accepted identifying one of the presented media program segments. In block 806, the representative thumbnail of the media program associated with the identified one of the media program segments is displayed.

Figure 8B:
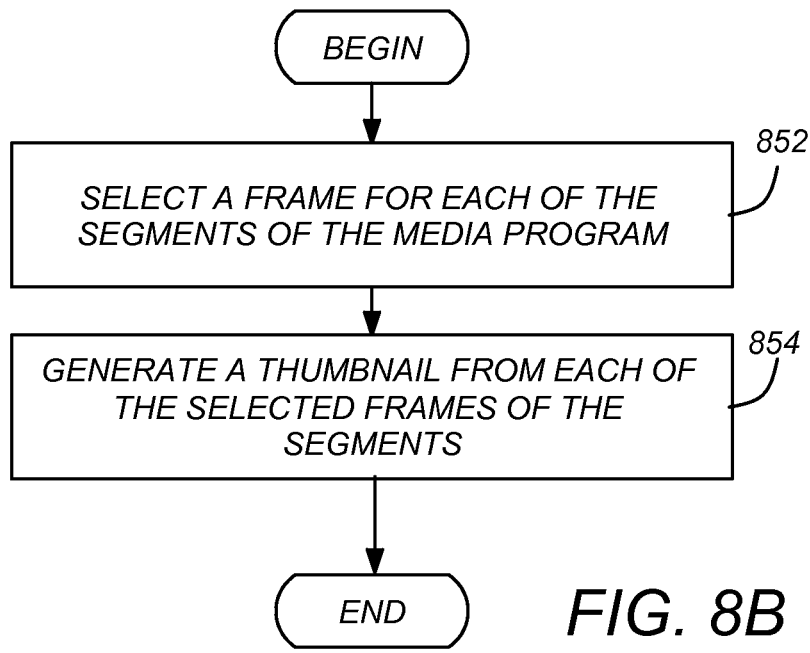
FIG. 8B is a diagram illustrating exemplary method steps that can be used to generate the thumbnails from which representative thumbnails are associated with media program segments.

FIG. 8B is a diagram illustrating exemplary method steps that can be used to generate the thumbnails from which representative thumbnails are associated with media program segments. In block 852, a frame is selected for each of the segments of the media program. In block 854, a thumbnail is generated from each of the selected frames of the segments.

Figure 9:
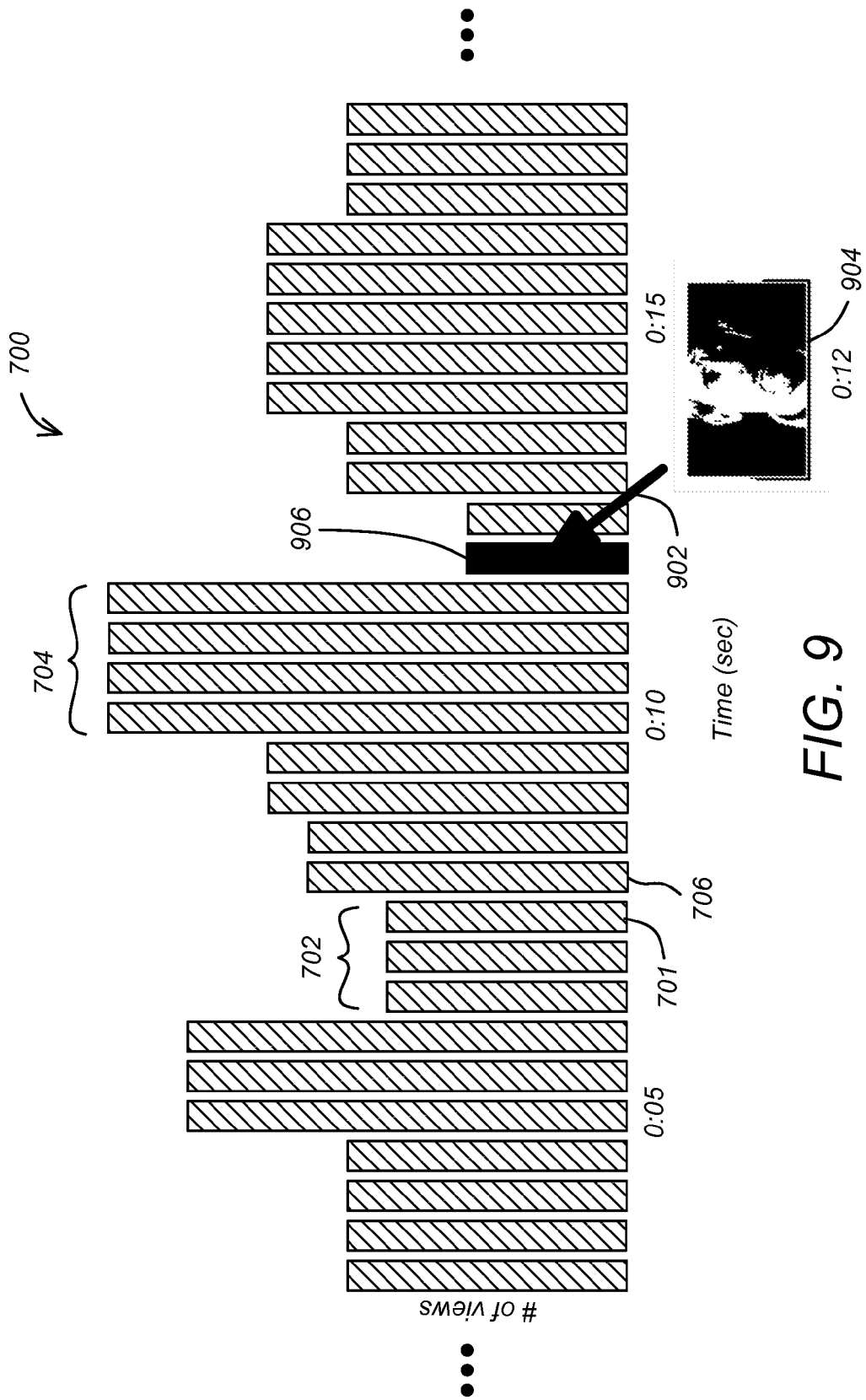
FIG. 9 is a diagram illustrating one embodiment of a user interface comprising a histogram and a thumbnail.

FIG. 9 is a diagram illustrating one embodiment of a user interface comprising a histogram 700 and a thumbnail 904. In this embodiment, when the user 132 manipulates the pointing device 216 of the client computer 102 to hover the cursor 902 over a bar 906 representing one or more segments of the media program, the bar 906 changes to delineate the bar from the other bars, and a thumbnail 904 of a frame of one or more media segments is displayed adjacent the user selected bar. As the cursor 902 is moved to hover over each of the bars of the histogram depicting the segments, the displayed thumbnail 904 changes so as to display the thumbnail associated with the one or more segments. If desired, the time of the segment can be displayed along with the thumbnail 904.

Using the pointing device 216 and the cursor 902, the user 132 may then click the bar 906 or the thumbnail, thus commanding the media player to play the media program beginning at the portion of the media program associated with the bar 906 or thumbnail 904.

Presentation of the Media Program Transcript

In one embodiment of the present invention, a transcript of the media program dialog can be presented, either in addition to, or in the alternative to the histogram 700 described above.

Figure 10:
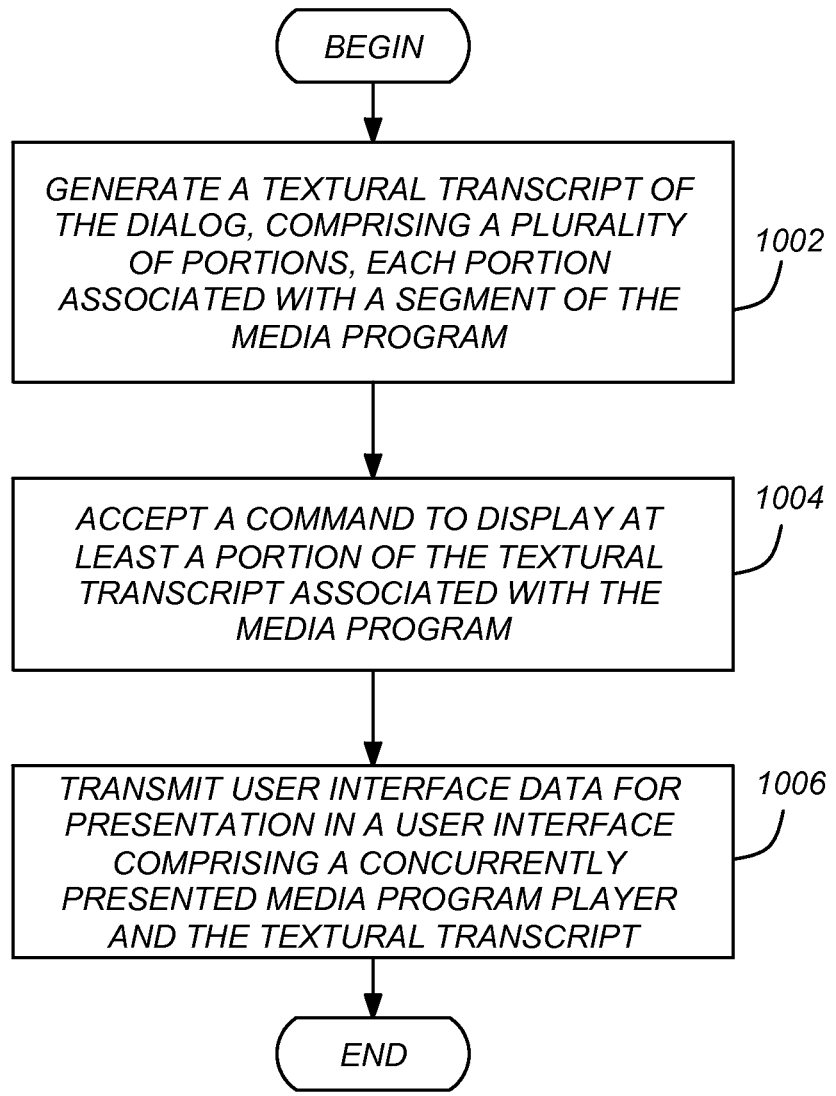
FIG. 10 is a diagram illustrating exemplary steps that can be used to present a media program transcript to the user.

FIG. 10 is a diagram illustrating exemplary steps that can be used to present a transcript of the dialog of a media program to the user. In block 1002, a textural transcript of the dialog is generated. The transcript includes a plurality of portions, each of which is associated with a segment of the media program. In one embodiment, the portions are defined by closed captioning phrases. In block 1004, a command to display at least a portion of the textural transcript is accepted. In one embodiment, the command to show the transcript is independent from any previous commands. In another embodiment, the command to show the transcript is received in response to a selection of one of the features on a user interface, which may include the bars on the histogram. In still another embodiment, the command to show the transcript provided by selecting a tab on the user interface. The command may also be a command that is received from a client computer 102 to select or view a media program, and the transcript is transmitted along with other data that is used to view and navigate the media program. In another embodiment, a command to select or view the media program is already received, and the user selects a further control in order to transmit the command to view the media program transcript. Examples are shown in FIG. 11.

Finally, in block 1006, the user interface data is transmitted to the client computer 102 where it is displayed. The user interface data includes the requested portions of the textural transcript. The user interface presents the textural transcript using the client computer 102. In one embodiment, the textural transcript is presented concurrently with a media program player. Further, as described below, user interface elements such as the media program player, the histogram 700, and the transcript may be synchronized so the selection of a navigation control of one of the elements is reflected in the other elements.

For example, if the command to show the transcript was performed by selecting one of the bars of the histogram 700, the portion of the transcript that is displayed is the portion associated with the portion of the program represented by the bar of the histogram. Further, if media program player commands are used to navigate the media program, those commands are reflected in the histogram and the textural transcript.

FIG. 11 is a diagram presenting an exemplary user interface 1100 by which the user may elect to view the transcript of a media program. The user interface 1100 includes a media player window 1114 in which the media program is rendered. The media player window 1114 includes a progress bar 1116 which indicates which portion of the media program is currently being played. The user may grab a slider control 1118 and move it left and right to begin play at an earlier or later point in the media program, respectively. The user interface 1100 may also include media player controls 1120A-1120E (alternatively referred to hereinafter as media player control (s) 1120). The media player controls 1120 may include a stop control 1120C, a play control 1120D, a pause control 1120B, a fast reverse control 1120A and a fast forward control 1120E.

The interface 1100 also includes a plurality of tabs 1102A-1102E, which allow the user to select information regarding the media program of interest. Tab 1102A allows the user to show default information regarding the media program. Tab 1102B allows the user to view reviews of the subject media program. Tab 1102C allows the user to view and participate in discussions with other users regarding the subject media program. Tab 1102D allows the user to view captions, or a transcript of the media program. Tab 1102E allows the user to create custom widgets that can be embedded in other websites that show the selected media programs.

In the embodiment shown in FIG. 11, the user 132 has selected the "captions" tab 1102D. In response to this selection, at least a portion of a transcript 1104 of the media program is presented in the user interface 1100. The transcript 1104 includes the phrases of the dialog and an adjacent time stamp, indicating when the phrase was uttered in the media program. In the illustrated embodiment, thumbnails 1106 associated with the phrases are also presented adjacent the phrase. The thumbnails 1106 may be generated manually, or by software which captures a frame temporally associated with the phrase of the transcript 1104. Further, the thumbnails 1106 can be generated in advance or in real time, when the user 132 selects the captions tab 1102D.

The user 132 can navigate to different portions of the transcript 1104 by selecting other pages, using controls 1108. Or, the user 132 can navigate to other portions of the transcript 1104 by selecting a bar 902 in the histogram 700. For example, if the user 132 moves the cursor over bar 902 that shows the relative number of views of a particular portion of the media program and selects that bar 902 (e.g. by clicking on it), the portion 1110 of the transcript 1104 associated with that particular portion of the media program is highlighted, as is the selected bar 902. If the selected bar 902 represents multiple phrases of the transcript 1104, those multiple phrases may be highlighted.

In one embodiment, the histogram 700 and the transcript are synchronized so that the same time interval of the media program is presented on both. In this embodiment, the histogram 700 and transcript 1104 for different portions of the media program can be viewed by manipulating a control on either the histogram 700 or the transcript 1104. For example, in the illustrated embodiment shown in FIG. 11, if the user 132 wishes to see the histogram 700 for portions of the media program after 0:40, the user may select histogram navigation button 1112, and the histogram will show results for a different portion of the media program (e.g. from 0:05 to 0:45 instead of 0:00 to 0:40 as currently illustrated). The portion of the transcript 1104 can be automatically changed to also show the selected portion of the media program (e.g. 0:05 to 0:45). Alternatively, the user may navigate the transcript 1104 (e.g. using transcript control 1108). In response, the transcript 1104 for different portions of the media program are presented, and the histogram 700 is updated so as to be synchronized with the transcript.

In other embodiments, the histogram 700 may reflect a larger portion of the media program than the transcript. For example, the histogram 700 may show the relative number of viewings for the entire media program. In this case, the histogram 700 may be used to navigate to different portions of the media program (e.g. by clicking on one of the bars), and the transcript will follow suit to show the dialog for the portion of the media program that was selected. In this embodiment, the histogram 700 may include further controls that allow the user 132 to expand the histogram 700 to show the entire media program or to contract the histogram 700 to show data for only a portion of the media program.

Transcript information can be obtained in a number of ways. In one embodiment, it is simply obtained from the closed captioning information encoded into the media program, whether by analog (line 21 of the vertical blanking interval, as defined by EIA-608, which is hereby incorporated by reference herein) or digital (EIA 708B, which is hereby incorporated by reference herein) means. In other embodiments, the transcript information can be obtained from the media program provider in a separate file.

Figure 12A:
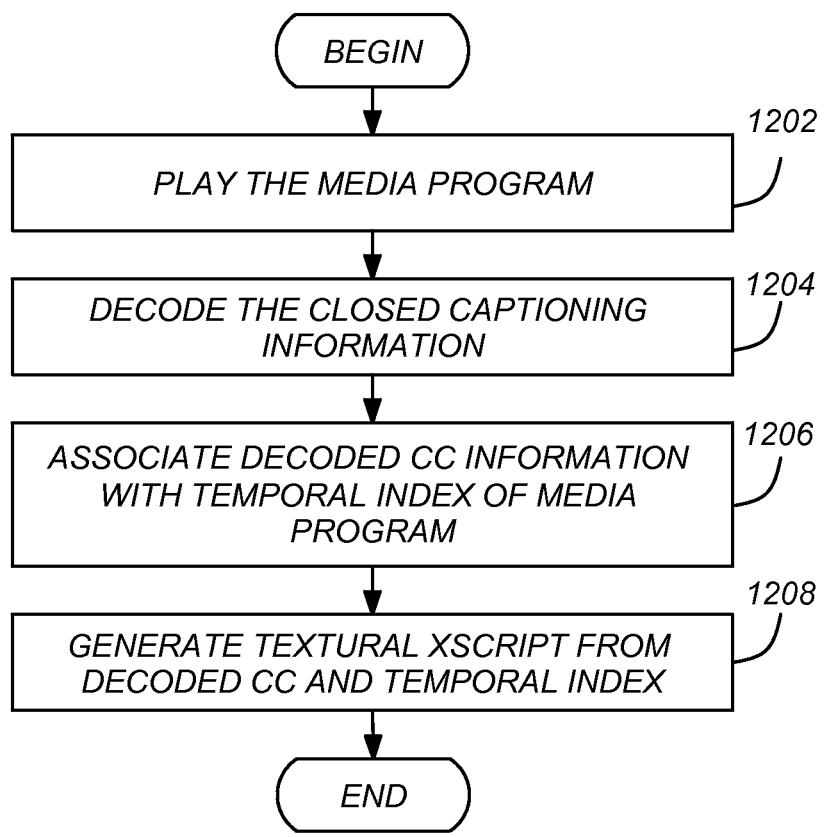
FIG. 12A is a diagram presenting exemplary method steps that can be used to generate the textural transcript.

FIG. 12A is a diagram presenting exemplary method steps that can be used to generate the textural transcript. In block 1202, the media program is played. This can be accomplished by a media player 420. In block 1204, the closed captioning information of the played media program is decoded, for example, by use of decoder 422. In block 1206, the decoded closed captioning (CC) information is associated with a temporal index of the media program. The temporal index will typically represent time, but it can represent frames, or blocks, or any other value that is a reasonable proxy for time. In block 1208, a textural transcript is generated from the decoded CC and the temporal index. This information is stored, for example, in database 312. In one embodiment, the information is transmitted to the web server 114 for storage.

In one embodiment, the user 132 may perform keyword searches of the transcript to identify portions of the media program that might be of interest.

Figure 12B:
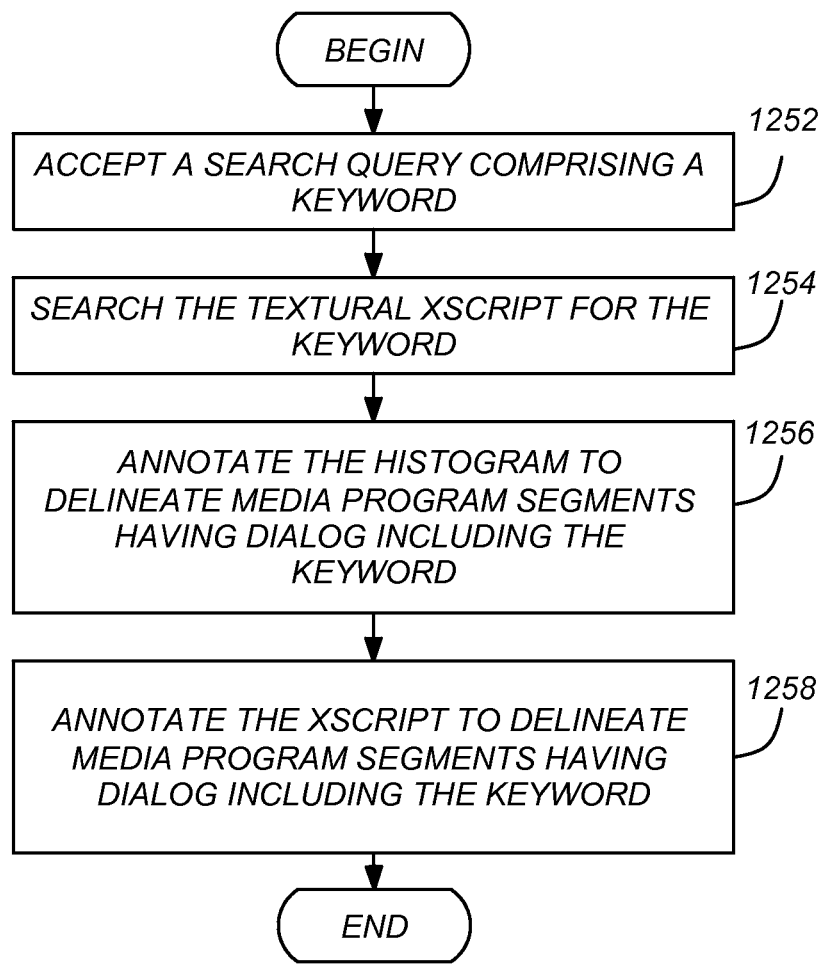
FIG. 12B is a diagram presenting exemplary steps that can be used to perform a keyword search of the transcript of the media program.

FIG. 12B is a diagram presenting exemplary steps that can be used to perform a keyword search of the transcript 1104 of the media program. First, a search query, comprising a keyword is accepted, as shown in block 1202. This can be accomplished, for example, by entering the keywords in the search box 1112 shown in FIG. 11. The textural transcript 1104 is then searched for the entered keywords, as shown in block 1204. The results can be presented by annotating the histogram 700 to illustrate which segments include textural information matching the entered keyword or keyword combinations, by annotating the transcript 1104 to show phrases where the keywords or keyword combinations are found, or both, as shown in blocks 1206 and 1208.

Figure 13:
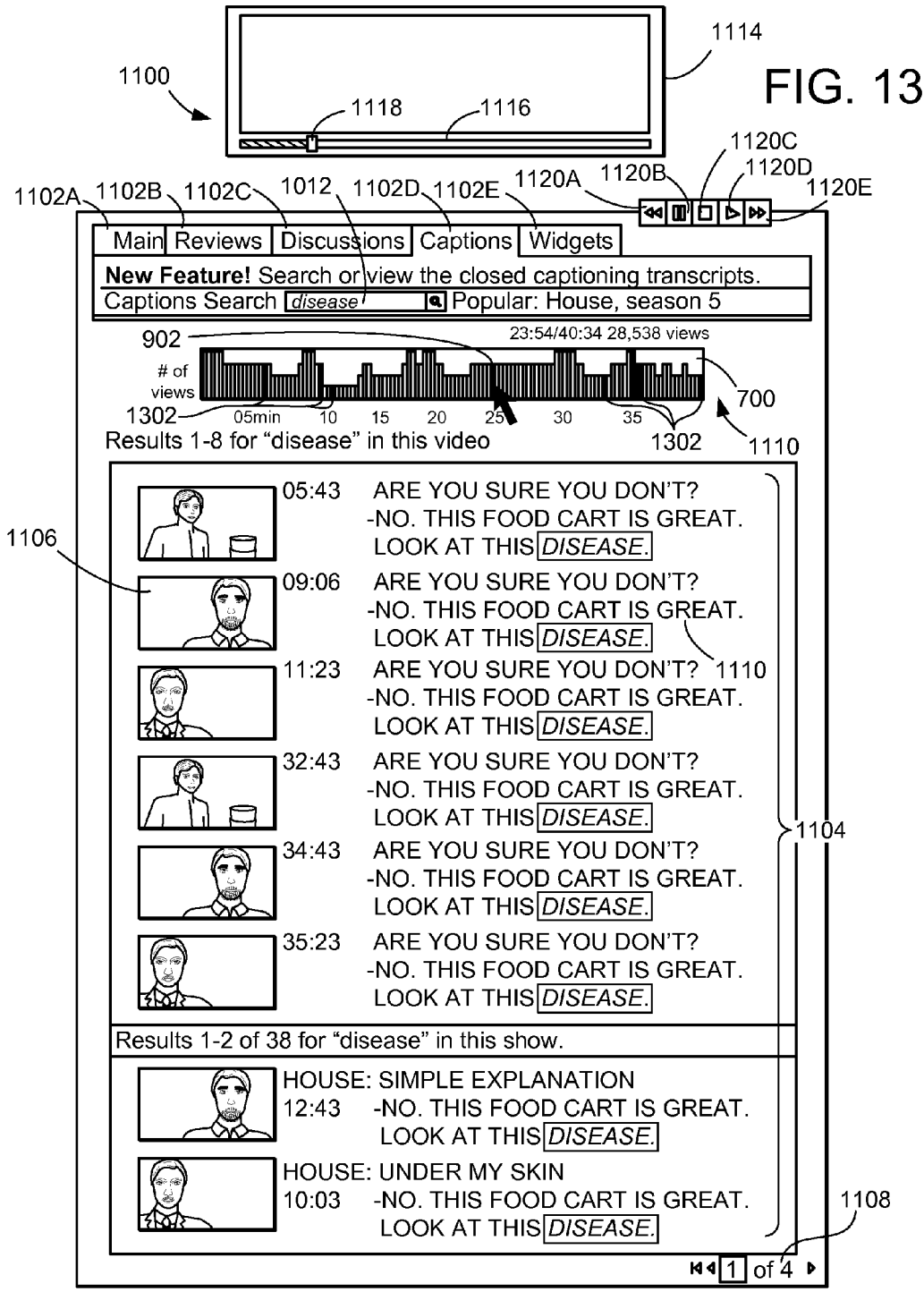
FIG. 13 is a diagram illustrating the user interface shown in FIG. 11 after the entry and search for keywords.

FIG. 13 is a diagram illustrating the user interface shown in FIG. 11 after the entry and search for keywords. In the example shown, the keyword "disease" was entered into a text entry box 1012, and a search performed. The transcript 1104 now shows the phrases in the media program in which the keyword was used, with the keyword itself highlighted. Representative thumbnails 1106 for the segments of the media program that include the keyword in the dialog can also be presented proximate the depicted portion of the transcript. Also, histogram 700 now shows bars 1302 representing those segments or portions of the media program where the keyword "disease" is included in the dialog. The user 132 may now navigate to different portions of the media program in which the dialog includes the word "disease" by selecting the highlighted bars 1302, the thumbnails 1106, or the "play this" control associated with each phrase.

The foregoing operations may be performed by one or more hardware or software modules implemented in the client computer 102, web server 406, and/or the media server 112. For example, the client computer 102 can implement one or more hardware or software module that accepts the user input, generates the required information to display to the user based on data received from the web server 114, and renders the information for display. Alternatively, the web server 114 may implement one or more hardware or software modules that accept the a message having the user input, generate the required information to display to the user 132, and transmit a message to the client computer 102, where the information can be displayed.

The functions and functionality described above can be implemented using hardware modules dedicated to the indicated functionality, or can be implemented using software or firmware modules having instructions being executed by processors. Furthermore, while the above disclosure presents embodiments in which functionality has been allocated to different hardware and/or software elements, the present invention can be implemented using different functional allocations as well. For example, although FIG. 4 depicts a web server 114 and a media server 112, embodiments may be practiced in which the functions performed by the web server 114 and media server 112 are a single entity. Further, other embodiments are possible wherein functions depicted as being allocated to one entity can be allocated to another. For example, the client computer 102 may store only sufficient user interface data to permit display of the user interface elements to the user, and rely on requests to the web server to obtain data in response to user input. Alternatively, the user interface data transmitted to the client computer 102 may include sufficient data to allow synchronization between all histogram and transcript for all portions of the media program without the need for further data from the web server 114 or the media server 112. Accordingly, a process step of accepting a user input may refer to the acceptance of the user input in the client computer 102, or of the acceptance of a message from the client computer 102 by the web server 114 or media server 112, wherein the accepted message includes user input.

Figure 14:
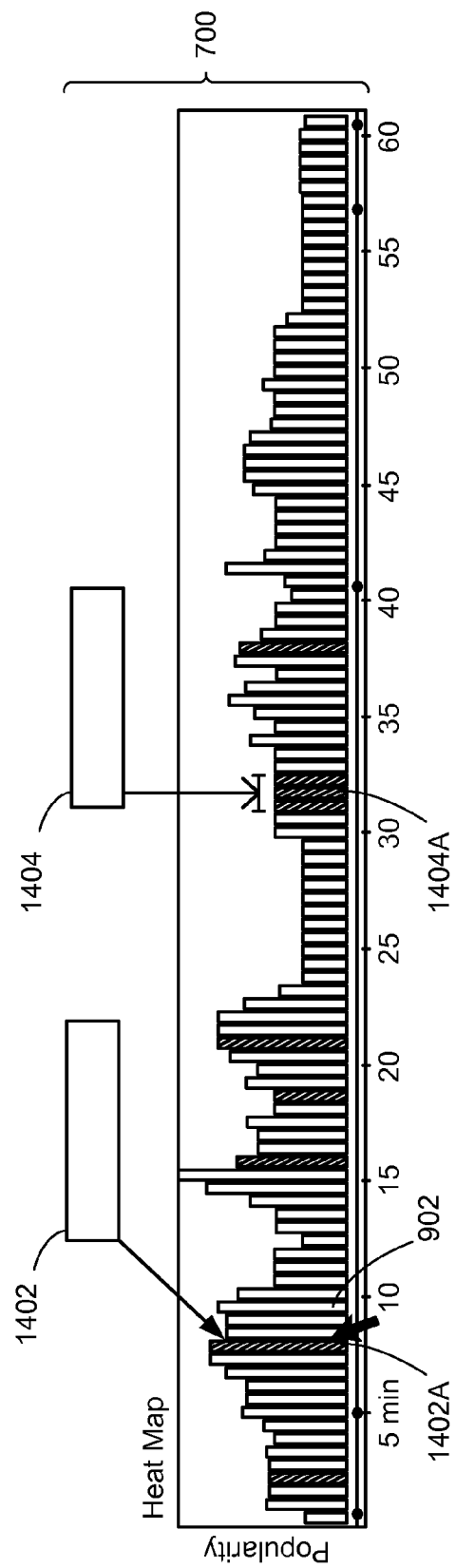
FIG. 14 is a diagram of an embodiment of a histogram, showing the use of histogram tags.

FIG. 14 is a diagram of the histogram portion of another embodiment of the user interface 1110. In this embodiment, the user 132 can tag selected segments with keywords. This feature is useful in that it allows the user 132 or other users to find segments of interest. FIG. 14 illustrates on embodiment of a histogram 700, showing the relative popularity of segments of a media program. A keyword search or other activity has identified some of the segments as more relevant than others, and these segments are delineated (for example, by darkening them) from the other segments. The user 132 can provide a tag command to the client computer 102 to select one or more of the segments for tagging. This can be accomplished, for example, by placing the cursor 902 over features 1402A and the three features 1404A and clicking the pointing device 216. In response, respective windows 1402 and 1404 are opened. The user may then enter text and/or symbols in the windows 1402 and 1404 to enter keyword(s). The entered text can be accepted by clicking away from the histogram 700.

Tags may be searched using a procedure analogous to that which is described above with respect to keyword searches of the transcript. When a tag keyword search is completed, the histogram 700 updated to indicate which segments of the media program have dialog that includes the searched tag keywords.

In one embodiment, entered tags may be locally stored in a memory of the client computer 102, so that they may be kept private, yet still searchable to find selected segments of the media program. In another embodiment, entered tags are transmitted to the web server 114 for storage in a database, thus enriching the information available in the database. This database can be made available for keyword searches by other client computers 102. In a further embodiment, whether tags are made available for searching by others can be controlled by the user 132 that entered the tag, with some tags shared and others held private.

For example, if user 132A tags the histogram from media program A, that tag may be entered into a web server 110 database and available for searching by user 132B using client computer 102B. Since the tag is associated with one or more media program segments, the information can be used to identify those portions of the media program that are responsive to the keyword. For example, if one user 132A entered the keyword "chase" to refer to media program 1404A and that tag is entered into the database for use in searches by other users, if user 132B enters a keyword search using the keyword "chase" either to search the same media program, a collection of media programs, or all available media programs, the portion of the media program represented by sections 1404A may be returned to that user 132B. The search results may be presented in a variety of different ways, including presentation each media program responsive to the keyword, along with a thumbnail and the portion of the media program that included the keyword (for example, the elapsed time when the portion begins and ends). For example, if user 132B performs a keyword search using the term "chase" the media program for which the histogram is pictured in FIG. 14 may be shown, the result may be the name of the media program, the portion of the media program associated with the keyword (in the illustrated embodiment, 31:00-32:00 minutes), and a thumbnail of that portion of the media program (e.g. a frame selected from that portion of the media program).

In one embodiment, the histogram 700 is also used to identify portions of the media program that the user 132 would like to embed into a webpage. This can be accomplished by accepting a command identifying one or more of the features of the histogram representing the desired portion of the media program, and automatically generating instructions for embedding the segments represented by the identified features into a webpage.

Figure 15:
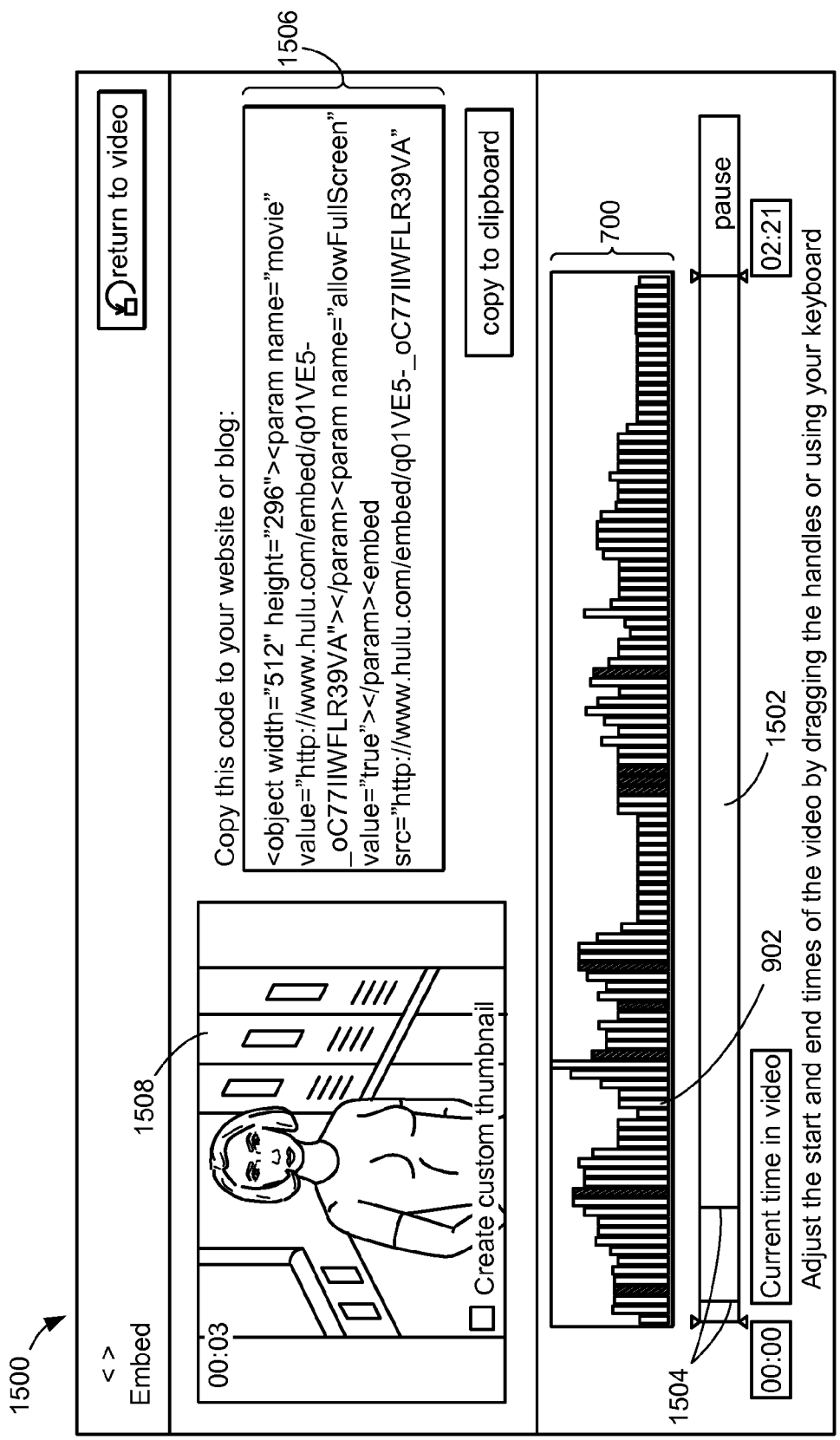
FIG. 15 is a diagram presenting an exemplary user interface 1500 for creating code that can be used to embed a selected portion of the media program into a webpage

FIG. 15 is a diagram presenting an exemplary user interface 1500 for creating code that can be used to embed a selected portion of the media program into a webpage. In the user interface 1500 a reproduction of the histogram 700 is presented, along with a control bar 1502. Control bar 1502 also includes delimiters 1504 that the user can select and slide along the control bar to indicate which segments of the media program (as represented by bars 902) that the user would like to embed into a webpage. Since the histogram 700 graphically illustrates the most popular portions of the media program, the it is easier for the user 132 to identify the desired segments. As described before, thumbnails may be displayed when the user hovers the cursor over the bars 902, allowing the user to preview the video content of the segment. Further, when a delimiter 1504 is moved to a location on the control bar 1502, a thumbnail portion 1508 of the user interface 1500 may be updated to show a thumbnail from the segment of the new location. The user may also create a custom thumbnail. Source code 1506 for embedding into the webpage is automatically generated in response to the entered position of the delimiters 1504 along the control bar 1502, and may be copied to the clipboard by selecting a single control in the user interface 1500.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of navigating a video program having a dialog and a plurality of segments, the method comprising:
   determining a textual transcript of the dialog, the textual transcript comprising a plurality of portions;
   determining a histogram having a plurality of features;
   synchronizing the plurality of portions of the textual transcript, the plurality of segments of the video program, and the plurality of features of the histogram; and
   transmitting user interface data including one or more portions of the textual transcript and one or more features of the histogram to a client computer for presentation in a user interface, the user interface comprising a concurrently presented video program player playing the video program and a window configured to include portions of the one or more portions of the textual transcript and features of the one or more features of the histogram, wherein a navigation to one of a portion of the one or more portions of the textual transcript, a feature of the one or more features of the histogram, and a segment of the video program causes a navigation to the other two of a corresponding portion of the one or more portions of the textual transcript, a corresponding feature of the one or more features of the histogram, and a corresponding segment of the video program based on the synchronizing.

2. The method of claim 1, wherein the video program is encoded with closed captioning information and determining the textual transcript of the dialog of the video program comprises:
   playing the video program;
   decoding the closed captioning information of the played video program;
   associating the decoded closed captioning information with a temporal index of the video program; and
   determining the textual transcript from the decoded closed captioning information and the temporal index.

3. The method of claim 1, further comprising:
   selecting a frame from a segment of the video program;
   generating a thumbnail from the selected frame of the segment of the video program;
   associating the generated thumbnail with the portion of the textual transcript associated with the segment of the video program; and
   adding the generated thumbnail to the textual transcript.

4. The method of claim 3, wherein the user interface displays the generated thumbnail proximate to the portion of the textual transcript corresponding to the segment of the video program.

5. The method of claim 1, wherein each feature of the plurality of features for the histogram indicates how often an associated segment of the video program has been viewed by a second client computer and a third client computer.

6. The method of claim 5, wherein the histogram is determined by performing:
   streaming a first set of the segments of the video program to the second client computer;
   streaming a second set of the segments of the video program to the third client computer; and
   determining the histogram from the combined first set of the segments of the video program and the second set of the segments of the video program.

7. The method of claim 1, wherein a navigation to a feature of the histogram causes a navigation to a corresponding segment for the portion of the textual transcript based on the synchronizing and a navigation to a corresponding segment of the video program in the video program player based on the synchronizing.

8. The method of claim 1, further comprising:
   accepting a search query having a keyword;
   searching the textual transcript based on the keyword; and
   annotating the textual transcript to delineate the segments of the video program having dialog including the keyword.

9. The method of claim 1, further comprising:
   receiving a selection of a feature of the one or more features;
   determining a corresponding portion of the textual transcript; and
   causing display the corresponding portion of the textual transcript in response to receiving the selection of the feature.

10. The method of claim 1, wherein the portion comprises a phrase.

11. A non-transitory computer-readable storage medium containing instructions for navigating a video program having a dialog and a plurality of segments, the instructions for controlling a computer system to be configured for:
    determining a textual transcript of the dialog, the textual transcript comprising a plurality of portions;
    determining a histogram having a plurality of features;
    synchronizing the plurality of portions of the textual transcript, the plurality of segments of the video program, and the plurality of features of the histogram; and
    transmitting user interface data including one or more portions of the textual transcript and one or more features of the histogram to a client computer for presentation in a user interface, the user interface comprising a concurrently presented video program player playing the video program and a window configured to include portions of the one or more portions of the textual transcript and features of the one or more features of the histogram, wherein a navigation to one of a portion of the one or more portions of the textual transcript, a feature of the one or more features of the histogram, and a segment of the video program causes a navigation to the other two of a corresponding portion of the one or more portions of the textual transcript, a corresponding feature of the one or more features of the histogram, and a corresponding segment of the video program based on the synchronizing.

12. The non-transitory computer-readable storage medium of claim 11, wherein the video program is encoded with closed captioning information and determining the textual transcript of the dialog of the video program comprises:
    playing the video program;
    decoding the closed captioning information of the played video program;
    associating the decoded closed captioning information with a temporal index of the video program; and determining the textual transcript from the decoded closed captioning information and the temporal index.

13. The non-transitory computer-readable storage medium of claim 11, further configured for:
selecting a frame from a segment of the video program;
generating a thumbnail from the selected frame of the segment;
associating the generated thumbnail with the portion of the transcript associated with the segment of the video program; and
adding the generated thumbnail to the textual transcript.

14. The non-transitory computer-readable storage medium of claim 13, wherein the user interface displays the generated thumbnail proximate to the portion of the textual transcript associated with the segment of the video program.

15. The non-transitory computer-readable storage medium of claim 11, wherein each feature of the plurality of features of the histogram indicates how often an associated segment of the video program has been viewed by a second client computer and a third client computer.

16. The non-transitory computer-readable storage medium of claim 15, wherein the histogram is determined by:
streaming a first set of the segments of the video program to the second client computer;
streaming a second set of the segments of the video program to the third client computer; and
determining the histogram from the combined first set of segments of the video program and the second set of segments of the video program.

17. The non-transitory computer-readable storage medium of claim 11, wherein a navigation to a feature of the histogram causes a navigation to a corresponding segment for the portion of the textual transcript based on the synchronizing and a navigation to a corresponding segment of the video program in the video program player based on the synchronizing.

18. The non-transitory computer-readable storage medium of claim 11, further configured for:
accepting a search query having a keyword;
searching the textual transcript based on the keyword; and
annotating the histogram to delineate the segments of the video program having dialog including the keyword.

19. The non-transitory computer readable storage medium of claim 11, further configured for:
receiving a selection of a feature of the one or more features;
determining a corresponding portion of the textual transcript; and
causing display of the corresponding portion of the textual transcript in response to receiving the selection of the feature.

20. The non-transitory computer-readable storage medium of claim 11, wherein the portion comprises a phrase.

21. An apparatus for navigating a video program having a dialog, comprising:
one or more computer processors; and
a computer-readable storage medium comprising instructions for controlling the one or more computer processors to be configured for:
determining a textual transcript of the dialog, the textual transcript comprising a plurality of portions;
determining a histogram having a plurality of features;
synchronizing the plurality of portions of the textual transcript, the plurality of segments of the video program, and the plurality of features of the histogram; and
transmitting user interface data including one or more portions of the full textual transcript and one or more features of the histogram to a client computer for presentation in a user interface, the user interface comprising a concurrently presented video program player playing the video program and a window configured to include portions of the one or more portions of the textual transcript and features of the one or more features of the histogram, wherein a navigation to one of a portion of the one or more portions of the textual transcript, a feature of the one or more features of the histogram, and a segment of the video program causes a navigation to the other two of a corresponding portion of the one or more portions of the textual transcript, a corresponding feature of the one or more features of the histogram, and a corresponding segment of the video program based on the synchronizing.

22. The apparatus of claim 21, further comprising:
a decoder for decoding closed captioning information of the played video program,
wherein the video program is encoded with closed captioning information and the determining the textual transcript of the dialog of the video program comprises:
associating the decoded closed captioning information with a temporal index of the video program, and
determining the textual transcript from the decoded closed captioning information and the temporal index.

23. The apparatus of claim 22, further configured for:
selecting a frame from a segment of the video program, generating a thumbnail from the selected frame of the segment, associating the generated thumbnail with the portion of the transcript associated with the segment of the video program, and adding the generated thumbnail to the textual transcript.

24. The apparatus of claim 23, wherein the user interface displays the generated thumbnail proximate to the portion of the textual transcript associated with the segment of the video program.

25. The apparatus of claim 21, wherein each feature of the plurality of features of the histogram indicates how often an associated segment of the video program has been viewed by a second client computer and a third client computer.

26. The apparatus of claim 25, further configured for determining the histogram from a combined first set of the segments of the video program streamed to the second client computer and a second set of the segments of the video program streamed to the third client computer.

27. The apparatus of claim 21, wherein a navigation to a feature of the histogram causes a navigation to a corresponding segment for the portion of the textual transcript based on the synchronizing and a navigation to a corresponding segment of the video program in the video program player based on the synchronizing.

28. The apparatus of claim 21, wherein the user interface further accepts a search query having a keyword and annotates the histogram to delineate the segments of the video program having dialog including the keyword based upon a search of the textual transcript for the keyword.

29. The apparatus of claim 21, further configured for:
receiving a selection of a feature of the one or more features;
determining a corresponding portion of the textual transcript; and
causing display of the corresponding portion of the textual transcript in response to receiving the selection of the feature.

30. The method of claim 1, further comprising:
transmitting synchronization information based on the synchronizing, wherein the user interface uses the synchronization information to perform the navigation.

31. The method of claim 1, further comprising:

receiving a navigation to a portion of the textual transcript included in the window of the user interface;

determining the associated segment of the video program for the portion of the textual transcript based on the synchronizing;

dynamically causing navigation to the segment of the video program associated with the selected portion of the textual transcript in the video program player in response to the received navigation;

receiving a navigation to a segment of the video program in the video program player;

determining the associated the portion of the textual transcript for the segment of the video program based on the synchronizing; and dynamically causing navigation to the portion of the textual transcript in the textual transcript associated with the selected segment of the video program in response to the received navigation.

32. A method comprising:

receiving one or more portions of a textual transcript of a dialog for a video program;

receiving one or more features of a plurality of features for a histogram, each feature representing a segment of the video program, wherein the one or more features of the histogram, the one or more portions of the textual transcript, and one or more segments of a plurality of segments of the video program are synchronized;

displaying, in a user interface, a concurrently presented video program player playing the video program and a window configured to include at least some of the one or more portions of the textual transcript and at least some of the one or more features for the histogram;

accepting a navigation to one of a portion of the one or more portions of the textual transcript, a feature of the one or more features of the histogram, and a segment of the video program;

determining the other two of a corresponding portion of the one or more portions of the textual transcript, a corresponding feature of the one or more features of the histogram, and a corresponding segment of the video program based on the synchronization; and navigating to the other two of the corresponding portion of the one or more portions of the textual transcript, the corresponding feature of the one or more features of the histogram, and the corresponding segment of the video program.

33. The method of claim 32, wherein each feature of the plurality of features for the histogram indicate how often a corresponding segment of the video program has been viewed by other users.

34. The method of claim 32, further comprising:

sending the navigation of the one of the feature of the plurality of features, the segment of the video program, and the portion of the textual transcript to a server; and receiving information to synchronize the other two of the corresponding feature of the one or more features, the corresponding segment of the video program, and the corresponding portion of the one or more portions from the server.

35. The method of claim 32, further comprising:

receiving synchronization information from a server, wherein the synchronization information is used to navigate to the other two of the corresponding feature of the plurality of features, the corresponding segment of the video program, and the corresponding portion of the textual transcript using the synchronization information without contacting the server.

\* \* \* \* \*